(12) United States Patent
Hansen et al.

(10) Patent No.: US 7,249,607 B2
(45) Date of Patent: Jul. 31, 2007

(54) LANDFILL CONDUIT SERVICING SYSTEMS AND METHODS FOR SERVICING LANDFILL CONDUITS

(75) Inventors: David L. Hansen, Ivins, UT (US); Dennis W. Super, Vestal, NY (US)

(73) Assignee: Landfill Service Corporation, Apalachin, NY (US)

( * ) Notice: Subject to any disclaimer, the term of this patent is extended or adjusted under 35 U.S.C. 154(b) by 476 days.

(21) Appl. No.: 10/830,676

(22) Filed: Apr. 23, 2004

(65) Prior Publication Data

US 2005/0236042 A1     Oct. 27, 2005

(51) Int. Cl.
*G05D 7/00* (2006.01)
(52) U.S. Cl. .............. 137/1; 137/236.1; 405/129.7; 405/129.85
(58) Field of Classification Search .............. 137/236.1, 137/1; 405/129.57, 129.7, 129.85
See application file for complete search history.

(56) References Cited

U.S. PATENT DOCUMENTS

| | | | | |
|---|---|---|---|---|
| 4,252,462 A | * | 2/1981 | Klingle et al. | 405/129.7 |
| 4,670,148 A | * | 6/1987 | Schneider | 210/603 |
| 5,265,979 A | | 11/1993 | Hansen | 405/129 |
| 5,636,940 A | | 6/1997 | Hansen | 405/128 |
| 5,924,821 A | | 7/1999 | Hansen et al. | 405/128 |
| 7,138,048 B1 | * | 11/2006 | O'Connor et al. | 210/136 |

\* cited by examiner

*Primary Examiner*—Kevin Lee
(74) *Attorney, Agent, or Firm*—Heslin Rothenberg Farley & Mesiti P.C.

(57) ABSTRACT

Systems, methods, and apparatus for servicing landfill conduits are disclosed. These systems, methods, and apparatus employ structures which facilitate access to and the servicing of buried landfill conduits, for example, one or more buried landfill laterals. In one aspect, the systems include an enclosure, at least one inlet conduit passing into the enclosure, at least one outlet conduit passing out of the enclosure, and at least one service conduit having a valve and an access port positioned between the inlet conduit and the outlet conduit. In another aspect, methods and portable apparatuses are provided for introducing high-pressure fluids or vacuum to a landfill conduit, for example, by means of the access port in the service conduit, to remove or dislodge obstructions. Conduits connected to blowers and pumps are used to introduce or withdraw fluids from the landfill conduits, for example, from predetermined locations within the landfill conduits identified by remote sensing devices.

18 Claims, 20 Drawing Sheets

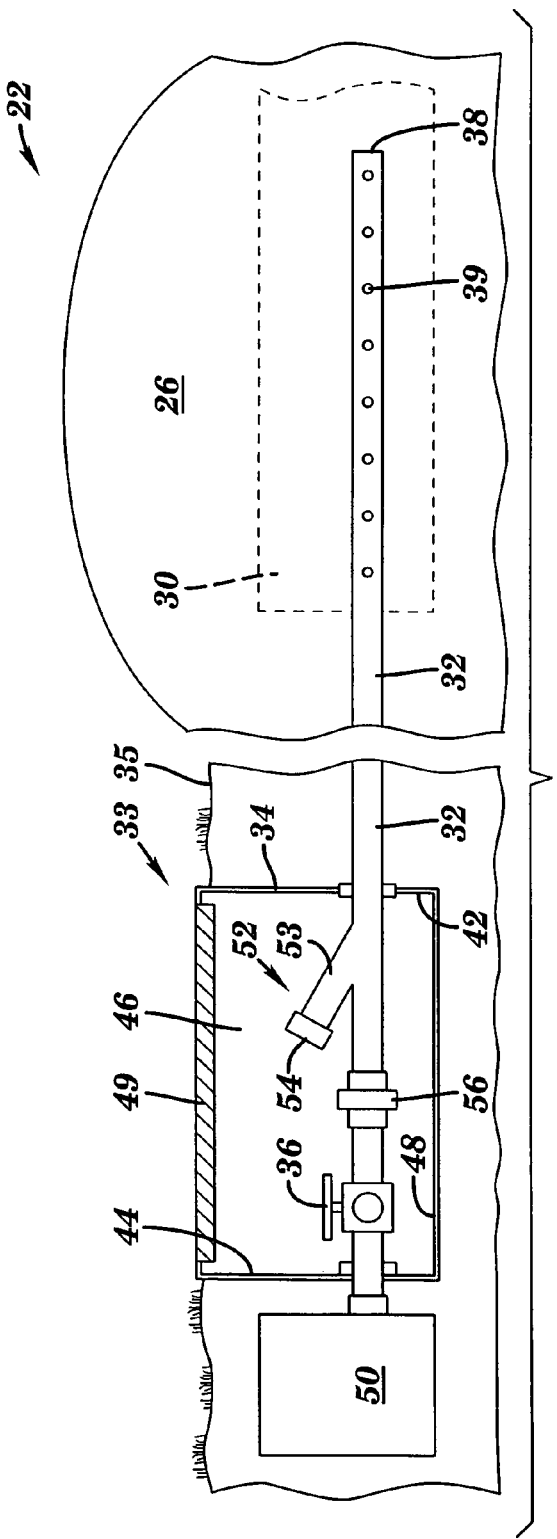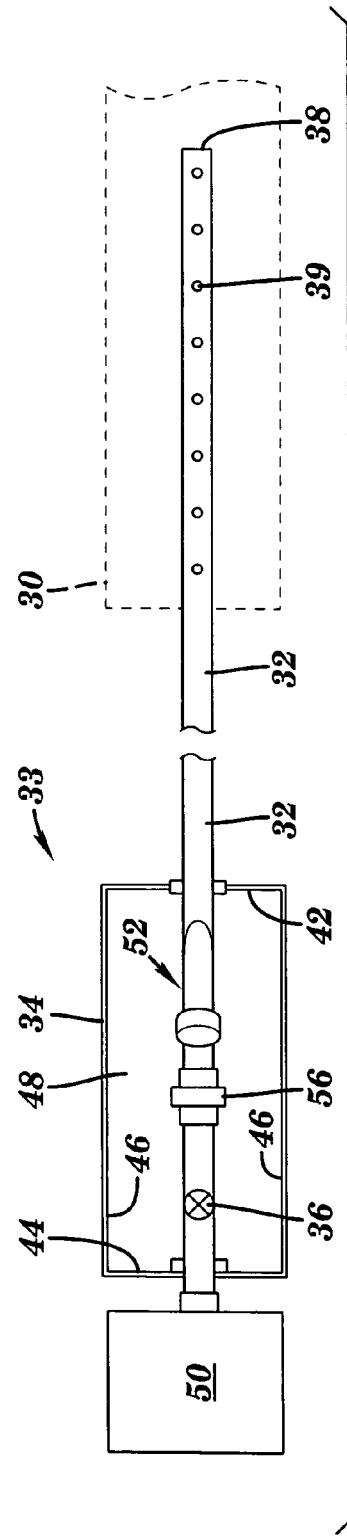

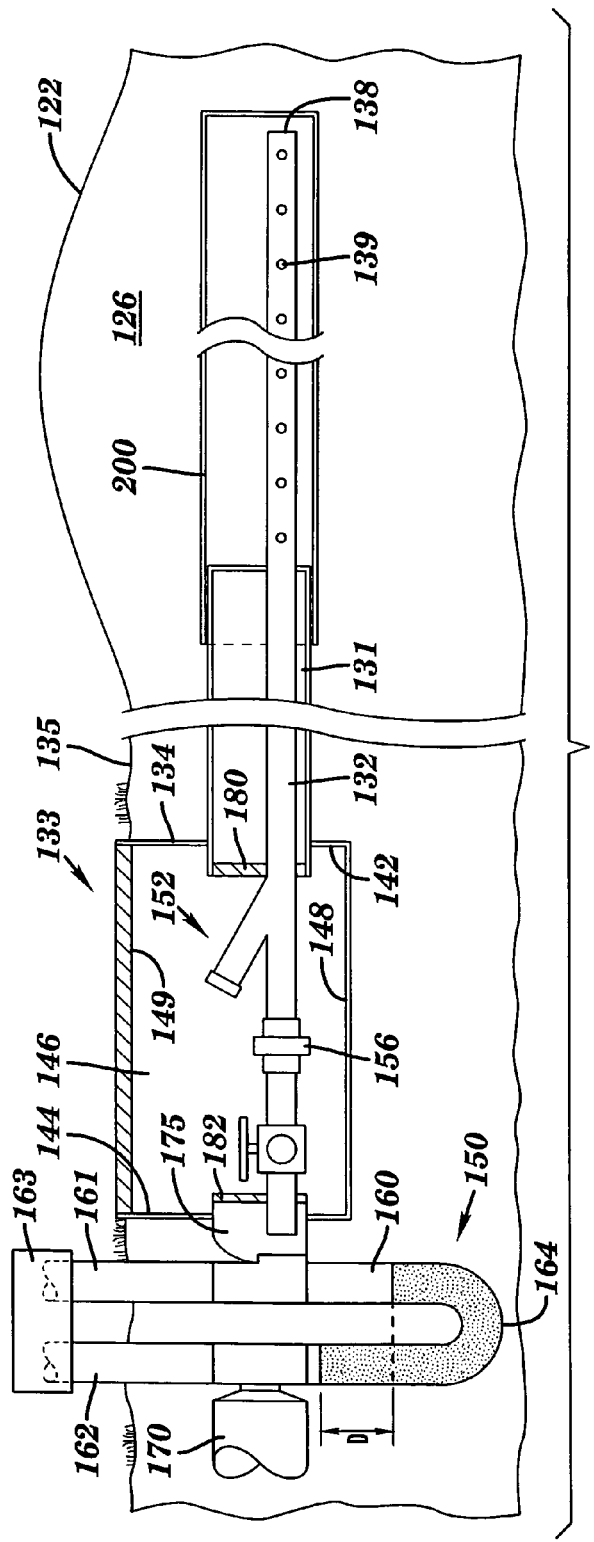
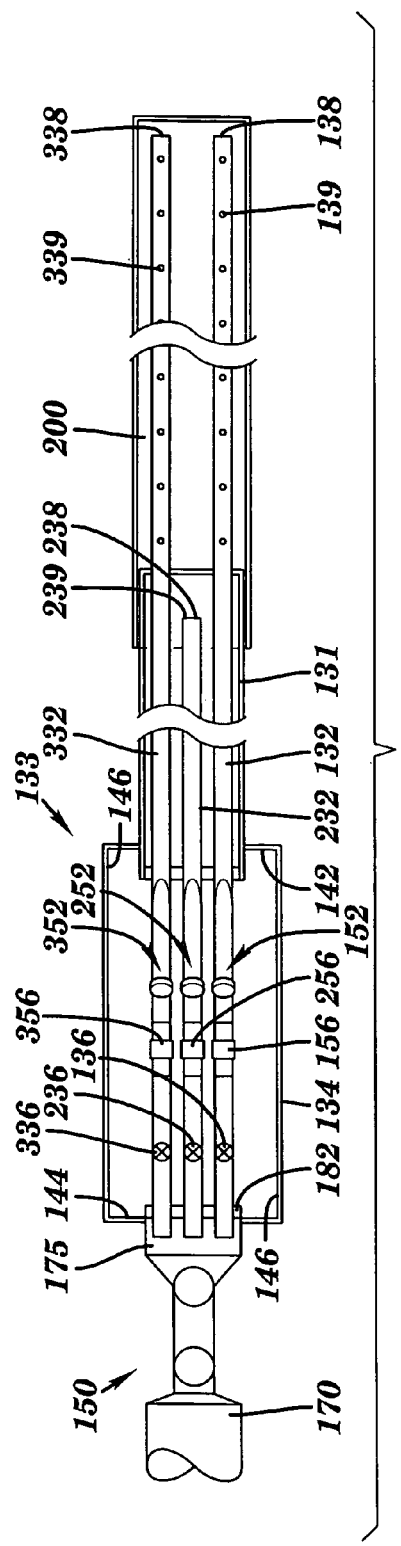
FIG. 5
FIG. 6

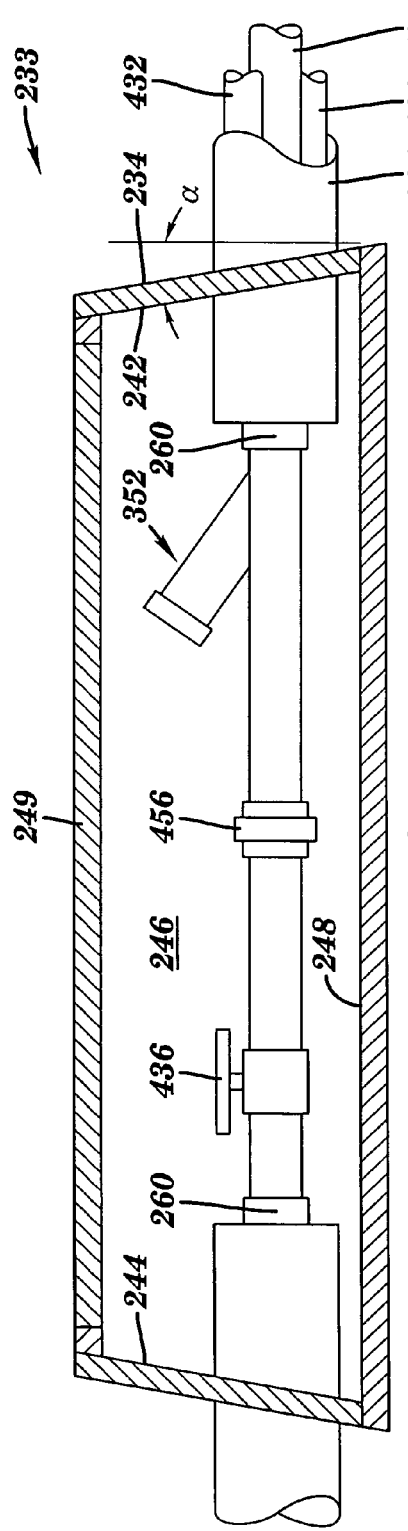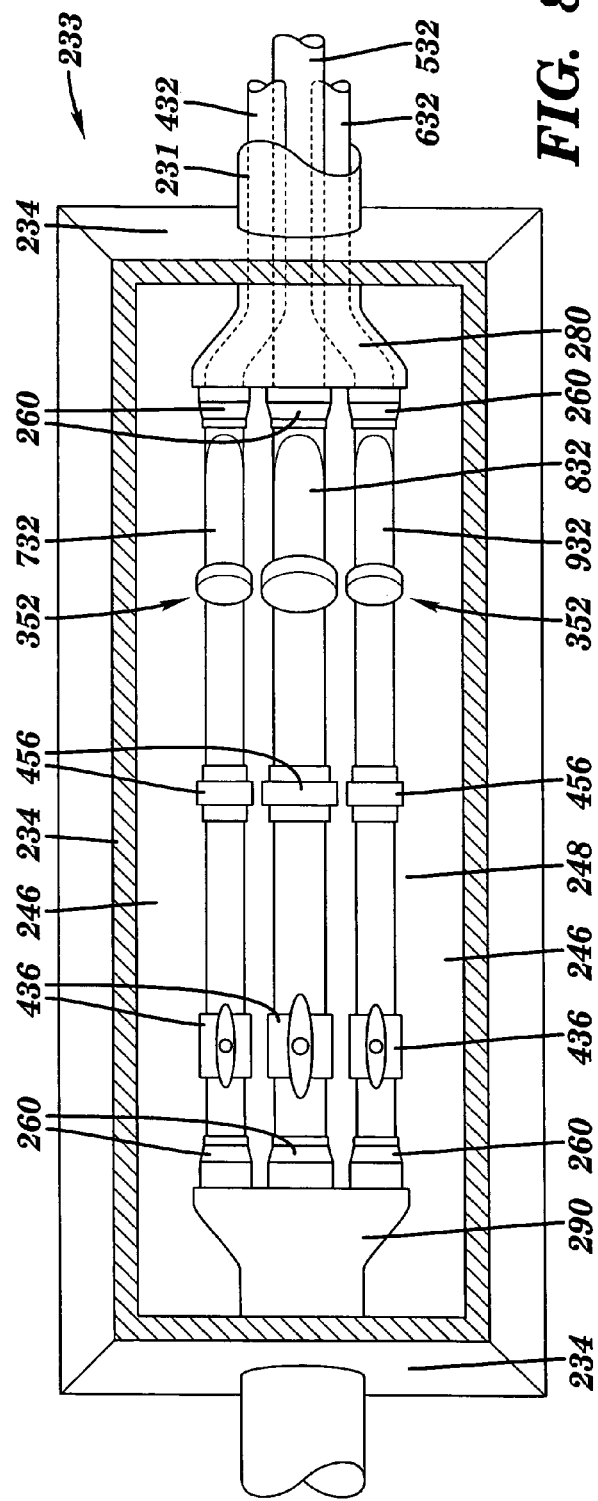

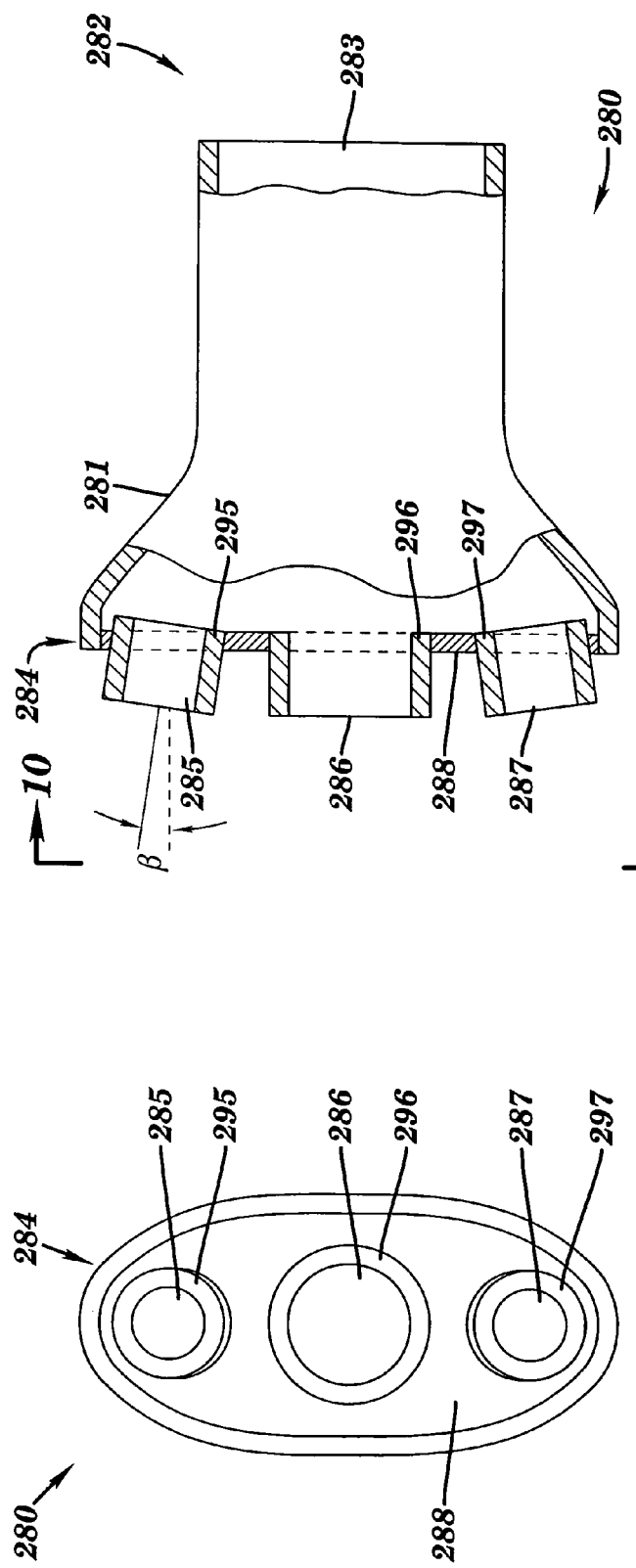
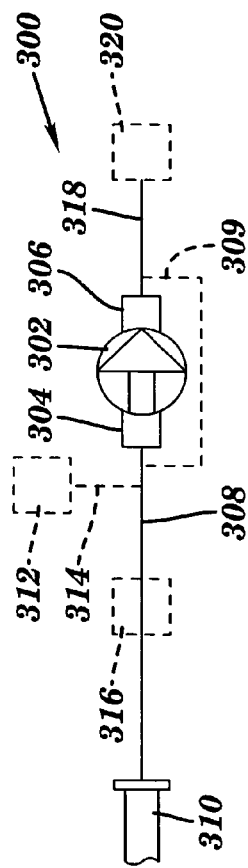

LANDFILL CONDUIT SERVICING SYSTEMS AND METHODS FOR SERVICING LANDFILL CONDUITS

FIELD OF THE INVENTION

This invention relates, generally, to systems, methods, and apparatuses for servicing landfill conduits, and, more particularly, to systems, methods, and apparatuses for removing fluids or dislodging material from buried landfill discharge conduits.

BACKGROUND OF THE INVENTION

Landfill conduits are increasingly being installed into new and existing solid waste landfills to extract landfill gases and liquids and to inject liquids. Landfill gases principally comprise methane and carbon dioxide, with small amounts of hydrogen sulfide, mercaptan and other trace gases. Landfill liquids typically comprise, for example, landfill leachate or other fluids. Liquids may be injected into landfills to, among other things, increase the biostabilization rates of the landfilled material. The typically horizontal landfill conduits may extend in trenches beneath or within the landfill and are typically perforated to collect landfill leachate and gases. The collected leachate and gases are typically passed to a central location for removal and treatment, for example, burning of the combustible landfill gases. However, these landfill conduits may be susceptible to failure due to becoming obstructed, for example, by an internal build-up of solids or fluids, for instance, becoming "water logged", that is, the back-up and stagnation of liquids in the conduits and related trenches.

In the past, buried landfill conduits that became obstructed with solids or liquids and became unusable to extract fluids from the landfill and were often abandoned because it was commonly believed that the obstructions in such conduits could not be effectively removed by prior art methods and devices. For example, one prior art method of removing obstructions in buried conduit includes the use of high-pressure water jets, for example, high-pressure rotary turbine cleaning jets. These high-pressure water jets can be effective in removing obstructions from some landfill conduits, for example, leachate lines designed to drain landfill liquids, but such methods are not effective in removing all types of obstructions from landfill conduits. For example, water jets are not effective in removing obstructions from gas extracting leachate lines that become water logged. Typically, water jets simply exacerbate the already undesirable water logging.

Other prior art methods of removing liquids obstructing landfill conduits include vacuum trucks or vacuum tanks that provide a source of vacuum at the terminal end of a landfill conduit. However, the vacuum supplied to the end of the conduit typically dissipates as the vacuum encounters the perforations in the conduit, perforations that may be typically far removed from the source of obstruction. Thus, such terminal vacuum sources are not effective in removing remotely located pockets of fluids, for example, liquids and gases. In addition, gases that are removed by such end-of-pipe vacuum sources may typically be combustible and undesirably provide a potential source of fire hazard or explosion hazard in and around the vacuum truck or vacuum tank.

One other prior art method of removing liquid obstructions in landfill conduits is to insert a pump into the conduit to draw out the obstructing liquids. However, such insertable pumps typically can only remove liquids and cannot effectively remove the mixture of liquid and gases that are typically encountered in such landfill conduits.

Aspects of the present invention overcome these and other limitations of the prior art.

SUMMARY OF THE INVENTION

Aspects of the present invention, address many of the limitations and disadvantages of prior art systems and methods by providing systems for quickly, efficiently, and cost-effectively servicing buried landfill conduits.

One aspect of the invention is a system for servicing at least one landfill conduit, the system including an enclosure having first end wall and a second end wall opposite the first end wall, the first and second end walls having at least one aperture; at least one inlet conduit passing through the at least one aperture in the first end wall, the at least one inlet conduit in fluid communication with the at least one landfill conduit; at least one outlet conduit passing through the at least one aperture in the second end wall, the at least one outlet conduit in fluid communication with a landfill fluid handling system; at least one service conduit providing fluid communication between the at least one inlet conduit and the at least one outlet conduit; and at least one access port positioned in the at least one service conduit. In one aspect of the invention, the at least one inlet conduit comprises a plurality of inlet conduits.

Another aspect of the invention is a method for servicing at least one landfill conduit using a servicing system, the servicing system having an enclosure having first end wall and a second end wall opposite the first end wall, the first and second end walls having at least one aperture; at least one inlet conduit passing through the at least one aperture in the first end wall, the at least one inlet conduit in fluid communication with the at least one landfill conduit; at least one outlet conduit passing through the at least one aperture in the second end wall, the at least one outlet conduit in fluid communication with a landfill fluid handling system; at least one service conduit for providing fluid communication between the at least one inlet conduit and the at least one outlet conduit; at least one valve positioned in the at least one service conduit for regulating fluid flow through the at least one service conduit; and at least one closable access port positioned in the at least one service conduit; wherein the method includes isolating a first landfill conduit from the landfill handling system by closing the valve in a first service conduit; opening the closable access port in the first service conduit; and servicing the at least one landfill conduit via the opened access port. In one aspect of the invention, servicing may include visual inspection, fluid jet cleaning, vacuum cleaning, and remote video inspection.

A further aspect of the invention is an apparatus for servicing a landfill conduit, the apparatus including a fluid pressurizing device having a low-pressure inlet and a high-pressure outlet; and a conduit having a first end insertable into the landfill conduit at a predetermined location and a second end adapted to selectively connect to the low-pressure inlet and the high pressure outlet of the fluid pressurizing device; wherein the fluid pressurizing device operates to one of: a) introduce a fluid to the predetermined location within the landfill conduit; and b) withdraw a fluid from the predetermined location within the landfill conduit. In one aspect of the invention, the fluid pressurizing device may be a blower or a pump.

A still further aspect of the invention is a method of handling a fluid in a predetermined location in a landfill conduit, the method including inserting the perforated first end of a conduit into the landfill conduit wherein the perforated first end is positioned at the predetermined location; providing a fluid pressurizing device having a low-pressure inlet and a high-pressure outlet; selectively connecting one of the low-pressure inlet and the high-pressure outlet of the fluid pressurizing device to a second end of the conduit to practice either a) introducing the fluid to the predetermined location within the landfill conduit; or b) withdrawing the fluid from the predetermined location within the landfill conduit.

An even further aspect of the invention is an apparatus for dislodging undesirable material in a landfill conduit, the apparatus including a storage tank for holding a liquid; a fluid pressurizing device having a low-pressure inlet operatively connected to the storage tank and a high-pressure outlet; and a conduit having a first end insertable into the landfill conduit and a second end operatively connected to the high-pressure outlet of the fluid pressurizing device; wherein the fluid pressurizing device draws liquid from the storage tank into the low-pressure inlet and discharges a pressurized stream of liquid from the high-pressure outlet, through the conduit, and into the landfill conduit to impact and dislodge material from within the landfill conduit.

Another aspect of the invention is method for dislodging undesirable material in a landfill conduit, the method including inserting a perforated first end of a conduit into the landfill conduit wherein the first end is positioned adjacent the desirable material; injecting a pressurized fluid into a second end of the conduit; directing the pressurized onto the undesirable material with the perforated first end of the conduit to dislodge the undesirable material.

A still further aspect of the invention is a fluid handling system for a landfill, the fluid handling system including a plurality of conduits operatively connected to a plurality of landfill conduits, the plurality of conduits containing landfill fluid flows; means for combining the fluid flows from the plurality of conduits into a combined fluid flow in fewer conduits, for example, a single conduit; and means for passing the combined fluid flow in the fewer conduits to a vertical conduit, for example, a vertical conduit of a barometric trap. In one aspect of the invention, the means for passing the combined fluid flow comprises a flexible coupling.

Another aspect of the invention is a system for handling landfill fluids, the system including a plurality of conduits operatively connected to a plurality of landfill conduits, the plurality of conduits containing landfill fluid flows; means for combining the fluid flows from the plurality of conduits into a combined fluid flow in fewer conduits; means for introducing the combined fluid flow into at least one of a barometric trap and a wellhead; and means for forwarding the combined fluid flow from at least one of the barometric trap and the wellhead to a landfill fluid handling system. In one aspect of the invention, the means for introducing the combined fluid flow into at least one of a barometric trap and a wellhead comprises at least one flexible coupling.

Another aspect of the invention is a method for handling landfill fluids, the method including providing a plurality of conduits operatively connected to a plurality of landfill conduits, the landfill conduits containing landfill fluid flows; combining the fluid flows from the plurality of conduits into a combined fluid flow in fewer conduits; introducing the combined fluid flow into at least one of a barometric trap and a wellhead; and forwarding the combined fluid flow from at least one of the barometric trap and the wellhead to a landfill fluid handling system. In one aspect of the invention, introducing the combined fluid flow into at least one of a barometric trap and a wellhead comprises providing at least one flexible coupling between the fewer conduits and one of the barometric trap and the wellhead.

Another aspect of the invention is a method for handling landfill fluids, the method including providing at least one conduit carrying landfill fluid comprising at least some liquid landfill fluid and at least some gaseous landfill fluid; separating the landfill fluid into a liquid stream comprising substantially only liquid landfill fluid and a gaseous stream comprising substantially only gaseous landfill fluid; forwarding the liquid stream to a liquid stream handling system; and forwarding the gaseous stream to a gaseous stream handling system. In one aspect of the invention, separating the landfill fluid into a liquid stream comprising substantially only liquid landfill fluid and a gaseous stream comprising substantially only gaseous landfill fluid comprises introducing the landfill fluid in a substantially vertically oriented conduit, for example, of a wellhead conduit or a barometric trap conduit.

Details of these aspects of the invention, as well as further aspects of the invention, will become more readily apparent upon review of the following drawings and the accompanying claims.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

FIG. 3 is a side elevation view, partially in cross-section, of one aspect of the present invention.

FIG. 4 is a plan view, partially in cross-section, of the aspect of the invention shown in FIG. 3.

FIG. 5 is a side elevation view, partially in cross-section, of another aspect of the present invention.

FIG. 6 is a plan view, partially in cross-section, of the aspect of the invention shown in FIG. 5.

FIG. 7 is a side elevation view, partially in cross-section, of another aspect of the present invention.

FIG. 8 is a plan view of the aspect of the invention shown in FIG. 7.

FIG. 9 is a front elevation view, partially in cross-section, of a conduit transition piece according to another aspect of the present invention.

FIG. 10 is a side elevation view of the conduit transition piece shown in FIG. 9 as viewed along lines 10-10.

FIG. 11 is a schematic diagram of a landfill conduit service apparatus according to another aspect of the present invention.

DETAILED DESCRIPTION OF FIGURES

Figure 1:
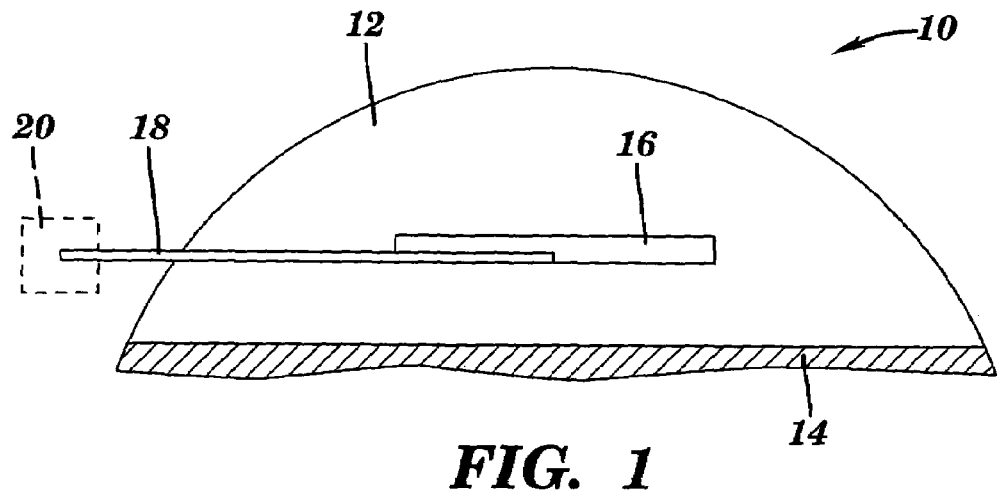
FIG. 1 is a cross-sectional view of a landfill constructed in accordance with the prior art.

The details and scope of the aspects of the present invention can best be understood upon review of the attached figures and their following descriptions. FIG. 1 is a cross-sectional view of a bulk material pile or landfill 10 constructed according to the prior art. Bulk material pile 10 may be situated on a base 14 and comprises bulk material 12. Pile 10 may include one or more substantially horizontal cavities or trenches 16 and at least one conduit 18. Although only one conduit is shown, typically any number of conduits 18 may reside in pile 10. Conduit 18 may be referred to as a "lateral pipe" or simply a "lateral" in the art. According to the prior art, conduits 18 are typically made from high-density polyethylene (HDPE) plastic.

As used herein, the term "bulk material" is intended to encompass any material that, when in a pile, would benefit from gas and/or liquid exchange; that is, removal of a gas and/or liquid produced therein, or the addition of a gas and/or liquid thereinto (as opposed to merely adding to the surface of the pile). One example of a bulk material is solid waste such as might be found in a landfill. As used herein, the term "conduit" means any structure that is capable of being a medium for channeling a gas and/or liquid, depending on the situation, between at least two locations. One example of a conduit is a pipe or system of pipes. As used herein, the term "substantially horizontal" is intended to distinguish from vertical and includes a slope of up to about five degrees. The term "substantially horizontal" is also intended to refer to surfaces that, although roughly horizontal in the aggregate, may contain localized dips or humps.

Figure 2:
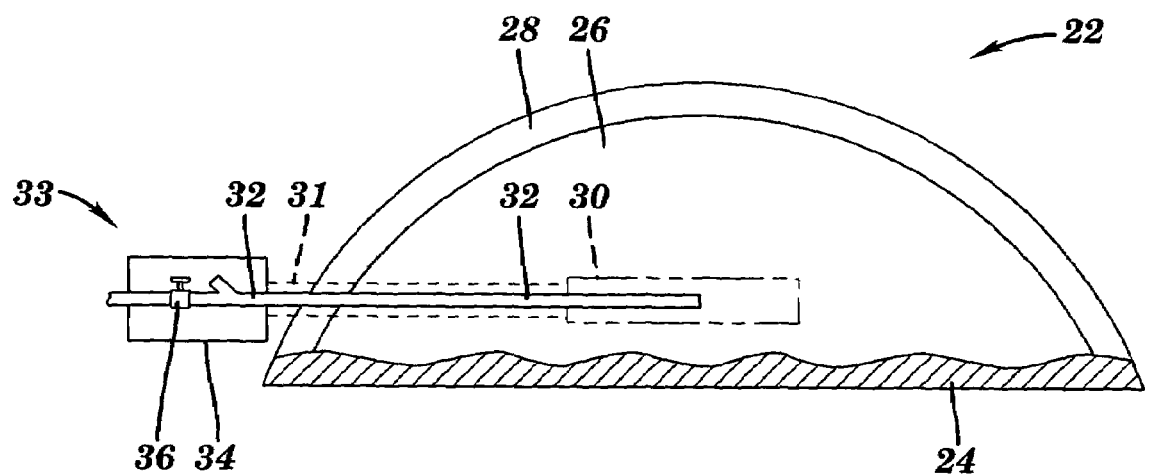
FIG. 2 is a cross-sectional view of a landfill constructed in accordance with the present invention.

FIG. 2 is a cross-sectional view of a bulk material, solid waste pile, or landfill 22 constructed in accordance with one aspect of the present invention. Solid waste pile 22 is situated on ground 24 and comprises solid waste 26, solid waste cap 28, and a conduit 32, which may comprise one or more conduits. In one aspect of the invention conduit 32 is perforated to allow entrance of gases and/or liquids into conduit 32. In another aspect of the invention, a perforated leaching chamber 30 (shown in phantom), for example, a leaching chamber and may be provided to permit accumulation of gases and/or liquids in chamber 30 and into conduit 32. Chamber 30 and one or more conduits 32 may be constructed according to the inventions described in commonly-assigned U.S. Pat. Nos. 5,636,940 and 5,924,821 (The disclosures of these patents are hereby incorporated by reference herein in their entirety.) and marketed under the registered trademark Hyex® by Landfill Service Corporation of Apalachin, N.Y., though other similar systems may be used for aspects of the present invention. Typically chamber 30 may provide a structure that both discourages the intrusion of bulk material 26 into chamber 30 and encourages gas and/or liquid exchange between chamber 30 and an area outside of bulk material pile 22 by means of conduits 32.

According to one aspect of the invention, solid waste cap 28 may provide a barrier between solid waste 26 and the ambient air and could be, for example, a layer of dirt or other material. In one aspect of the invention, solid waste cap 28 may be provided by the inventions disclosed in commonly assigned U.S. Pat. No. 5,265,979, or their equivalents.

According to aspect of the invention, conduit 32 typically extends outside of solid waste pile 22 and into system 33 having enclosure 34. In one aspect of the invention, conduit 32 may be encased in a protective conduit 31 (shown in phantom in FIG. 2). Protective conduit 31 protects conduit 32, or one or more conduits 32, from damage. Conduit 32 may pass through enclosure 34 and one or more fittings or control devices for conduit 32 may be located within enclosure 34. Protective conduit 31 typically terminates at enclosure 34 and is typically isolated from enclosure 34, for example, by an appropriate barrier or sealing arrangement. System 33 may be at least partially buried and enclosure 34 may be accessible by means of a removable access cover. According to aspects of the present invention, system 33 provides a system for implementing methods for servicing one or more conduits 32, for example, cleaning one or more conduits 32. In one aspect of the invention, enclosure 34 of system 33 may house one or more valves 36 for isolating conduit 32 or regulating the flow of fluids through conduit 32. In one aspect of the invention, enclosure 34 may be referred to as a "valve vault".

Before solid waste 26 in pile 22 stabilizes, the decomposition thereof typically creates solid waste gases within the solid waste pile, for example, methane, carbon dioxide, hydrogen sulfide, and mercaptan, among others. As used herein, the term "solid waste gas" refers to any single gas or combination of gases produced by the decomposition or other interaction of solid waste. The build-up of solid waste gases can create an unpleasant and potentially dangerous environment. Conduit 32, and in some cases leaching chamber 30, allow the solid waste gases to be extracted, removed, and, ideally, treated, rather than being released into the ambient air. In one aspect of the invention, valve 36 can be opened to allow the built-up solid waste gases to escape or be extracted and treated, thus reducing or eliminating the unpleasant and dangerous conditions. Conventional methods of treating or disposing of collected solid waste gases, such as combustion, may be used to treat the gases removed from solid waste pile 26.

One way to accelerate the decomposition and resultant stabilization of a solid waste pile is to add moisture to the solid waste. A liquid, for example, water, can be added to solid waste 26 through conduit 32. Optionally, wastewater collected in the landfill, referred to as "leachate", can be injected into an area within the pile 22 through one or more conduits 32. As used herein, the term "injected" includes any method of introducing liquid into a bulk material pile through a conduit, including, for example, by means of gravity or pressure. This would provide a low-cost method of leachate disposal while also accelerating the solid waste decomposition process. As used herein, the terms "fluid" or "fluids" apply to any fluent material capable of flowing, including gases, for example, solid waste gas, and liquids, for example, leachate.

FIG. 3 is a side elevation view, partially in cross-section, of one system 33 that can be used to service one or more conduits 32 as shown in FIG. 2. FIG. 4 is a plan view, partially in cross-section of system 33 shown in FIG. 3. System 33 includes an enclosure 34, for example, at least one enclosure 34, that is accessed by one or more conduits 32. As described with respect to FIG. 2, conduit 32 typically includes a distal end 38 located within solid waste 26 of pile 22. Distal end 38 may have perforations 39 or may be enclosed within a perforated leachate chamber 30 (shown in phantom). Again, conduit 32 may comprises a plurality of conduits, for example, at least 2 conduits or at least 3 conduits. Enclosure 34 typically includes a first end wall 42, a second end wall 44 opposite first end wall 42, and side walls 46 (only one of which is shown in FIG. 3. Though not required in one aspect of the invention, enclosure 34 may also include a floor or base 48 (shown in phantom). Enclosure 34 may also include a cover 49, for example, a removable cover or hinged door that permits access to enclosure 34. Cover 49 is not shown in the plan view shown in FIG. 4. Enclosure 34 may also be at least partially buried, for example, as indicated by ground level 35 in FIG. 3.

According to one aspect of the present invention, conduit 32 passes through first end wall 42 and is adapted to pass through second end wall 44 and access a landfill fluid handling system 50. Fluid handling system 50 may include one or more gas-control well heads, one or more barometric traps, one or more landfill manifold systems, or a combination thereof, among other fluid handling systems. According to the aspect of the invention shown in FIGS. 3 and 4, system 33 includes at least one access port 52. Access port 52 may be any port that permits access to the interior of pipe 32. In one aspect of the invention, access port 52 includes a conduit 53 and a cover 54, for example, a removable cover, permitting access to the interior of pipe 32 for servicing while also providing a fluid-tight seal to prevent leakage of liquids or gases from pipe 32 when in operation. Access port 52 may be provided by any form of conduit or pipe 53 that provides access to conduit 32, for example, a vertical conduit or a horizontal conduit projecting from conduit 32. In the aspect of the invention shown in FIGS. 3 and 4, conduit 53 comprises a conduit that projects from conduit 32 at an angle that is not perpendicular to the axis of conduit 32, for example, conduit 32 may be oriented at any angle greater than about 0 degrees and less than about 90 degrees from the axis of conduit 32, for example, conduit 53 may make an angle of between about 30 degrees and about 60 degrees with the axis of conduit 32. In one aspect of the invention, conduit 53 comprises a standard "wye" pipe coupling.

According to one aspect of the invention, system 33 includes at least one flow-regulating device 36. Flow regulating device 36 may be any device that can be used to regulate the flow of fluids from conduit 32 to fluid handling system 50. In one aspect of the invention, flow-regulating device 36 comprises at least one valve, for example, a butterfly-type valve, a ball-type valve, a gate-type valve, or their equivalent. In one aspect of the invention, valve 36 may comprise a metallic or plastic valve, for example, valve 36 may comprise a Hypalon® chlorosulfonated polyethylene ball valve. Valve 36 may be manually operated or automatedly operated by means of an automated valve controller (not shown). Though flow regulating device 36 may comprise any type of device that can be used to regulate the flow of fluids through conduit 32 and related conduits, to facilitate discussion, in the following discussion flow regulating device 36, and its related devices, will be referred to as a "valve".

System 33 may also include one or more couplings or unions 56. As shown in FIGS. 3 and 4 union 56 may be used to separate conduit 32 between valve 36 and access port 52, for example, to remove or service conduit 32, valve 36 or access port 52. However, though not shown in FIGS. 3 and 4, one or more unions 56 may be located as needed within enclosure 34. For example, in one aspect of the invention a union 56 is located between end wall 44 and valve 36, or between access port 52 and end wall 42.

In one aspect of the invention, the length of conduit 32 that resides in enclosure 34 is flexible, for example, sufficiently flexible to allow lifting, bending, and deflection of conduit 32 to manipulate conduit 32, access port 52, union 56, and valve 36 to facilitate maintenance and servicing of system 33 and its components. In one aspect of the invention, conduit 32 and access port conduit 53 may comprise metallic or non-metallic conduit. For example, conduits 32 and 53 may comprise plastic conduit, for example, PVC plastic, polyethylene (PE) plastic, high-density polyethylene (HDPE) plastic, polypropylene (PP), polyester, or their equivalents. In one aspect, conduits 32 and 53 may comprise iron, steel, or aluminum conduit or conduit may of other similar structural metals.

Enclosure 34 may also comprise metallic or non-metallic materials of construction. For example, enclosure 34 may be metallic, for example, made from iron, steel, aluminum, or similar structural metals. Enclosure 34 may also be non-metallic, for example, enclosure 34 may be made, from plastic, for instance, PVC plastic, PE plastic, HDPE plastic, PP plastic, polyester, or their equivalents. Enclosure 34 may also be made from wood, for example, pressure treated lumber. Enclosure 34 may include structural reinforcing members (not shown), for example, gussets, stays, cross beams, and the like, as needed to ensure the structural integrity of the enclosure and, for example, prevent collapse of the side walls 46 or end walls 42, 44.

In one aspect of the invention, conduit 32, valve 36, access port 52, and union 56 typically comprise structures having nominal diameters between about 1 inch and about 12 inches, for example, typically, between about 3 inches and inches 6 inches in nominal diameter. Larger or smaller nominal sizes may also be used depending upon the size of the landfill 22 and the expected flow of fluid through conduit 32 and its related hardware.

In one aspect of the invention, enclosure 34 may be rectangular in shape, for example, a right rectangular parallelepiped. In another aspect of the invention, enclosure 34 may be frusto-conical in shape, for example, having upwardly expanding sidewalls. In one aspect of the invention, enclosure 34 may be non-rectangular, for example, circular cylindrical in shape, spherical in shape, or hemispherical in shape. In the aspect of the invention where enclosure 34 is rectangular in shape, for example, as shown in FIGS. 3 and 4, enclosure 34 may have a length in the direction of conduit 32 that is longer than its width. For example, to facilitate manipulation of conduit 32 and its related components, enclosure 34 may have a length-to-width aspect ratio of greater than 1, preferably, having an aspect ration of at least 1.5, for example, 2.0 or greater. For example, in one aspect of the invention, enclosure 34 has a length, that is, a length in the direction along the axis of conduit 32, of between about 5 feet and about 12 feet, for instance, about 8 feet, and may have a width of between about 2 feet and about 6 feet, for example, about 2½ feet. The depth of enclosure is a function of many features of system 33, including the depth or position of conduit 32, and the height of valve 36 and access port 52, among other things. According to one aspect of the invention, the aspect ratio of the length to depth of enclosure 34 may be at least 0.25, for example, at least 0.5. For example, in one aspect of the invention, enclosure 34 may have a depth of between about 1 foot and about 8 feet, for example, about 2 feet.

According to aspects of the present invention, system 33 provides the maintenance or service provider with an improved capability of accessing and servicing landfill laterals, for example, the purging or evacuation of laterals obstructed by solids liquids or gases, compared to prior art methods. According to one aspect of the invention, when conduit 32 requires repair or maintenance due to the presence of an obstruction, maintenance personal may readily access enclosure 34 via door 49 and, for example, isolate conduit 32 from landfill fluid handling system 50 by closing valve 36. Thus isolated, the interior of conduit 32 may be accessed by removing cover 54 from access port 52. Maintenance personnel may then service conduit 32, for example, by visual or manual inspection, by inserting tools such as snakes or other means of removing obstructions, or by inserting hoses for injecting high-pressure fluids or for extraction fluids using vacuum. Other methods of servicing conduit 32 that will be facilitated by aspect of the present invention will be discussed below with respect to other aspects of this invention.

FIGS. 5 and 6 illustrate system 133 for servicing landfill laterals according to another aspect of the present invention. FIG. 5 illustrates a side elevation view similar to FIG. 3 for the aspect of the present invention used for servicing multiple landfill laterals. FIG. 6 is a plan view similar to FIG. 4 of the aspect of the invention shown in FIG. 5. According to this aspect of the invention, system 133 provides means for servicing two or more landfill laterals 132, 232, and 332 in a manner similar to which system 33 provides means for servicing lateral 32 shown in FIGS. 3 and 4. In the aspect of the invention shown in FIGS. 5 and 6, similar structures that were identified using two-digit reference numbers in FIGS. 3 and 4 are identified in FIGS. 5 and 6 with three-digit reference numbers, the last two digits of which correspond to the reference numbers used in FIGS. 3 and 4. For example, laterals 132, 232, and 332 in FIGS. 5 and 6 correspond to lateral 32 in FIGS. 3 and 4.

In FIGS. 5 and 6, conduits 132, 232, and 332 may be serviced using system 133, which corresponds to and has similar features to system 33 illustrated and described with reference to FIGS. 3 and 4. However, unlike conduit 32 in FIGS. 3 and 4, conduits 132, 232, and 332 may be associated with a leaching chamber 200, for example, the leaching chamber disclosed in U.S. Pat. Nos. 5,636,940 and 5,924,821 and marketed under the registered trademark Hyex® by Landfill Service Corporation. In this aspect of the invention, conduits 132, 232, and 332 may be of varying length and each run from leaching chamber 200 to system 133. As shown in FIGS. 5 and 6, conduits 132, 232, and 332 may also be enclosed in protective conduit 131, which may engage and extend into leaching chamber 200. Similar to conduit 32, conduits 132, 232, and 332 typically include distal end 138, 238, and 338 located within leachate chamber 200 which is located within solid waste 126 of pile 122. Distal ends 138, 238, and 338 may have perforations 139, 239, and 339. Again, conduit 132, 232, and 332 may comprise two or more conduits, for example, at least 3 conduits as shown, or, in one aspect of the invention, at least 6 conduits, or even 12 or more conduits.

In this aspect of the invention, system 133 comprises enclosure 134 which may be similar to and have all the properties and dimensions of enclosure 34 shown in FIGS. 3 and 4. However, due to the increased number of conduits 132, 232, and 332 entering enclosure 134, enclosure 134 may be larger than enclosure 34, for example, wider than enclosure 34. Enclosure 134 typically includes a first end wall 142, a second end wall 144 opposite first end wall 142, and side walls 146 (only one of which is shown in FIG. 5). Though not required in one aspect of the invention, enclosure 134 may also include a floor or base 148 (shown in phantom). Enclosure 134 may also include a cover 149, similar to cover 49. Similar to enclosure 34, enclosure 134 may also be at least partially buried, for example, as indicated by ground level 135 in FIG. 5.

According to this aspect of the present invention, conduits 132, 232, and 323 pass through first end wall 142 and are adapted to pass through second end wall 144 and access a landfill fluid handling system 150. In the aspect of the invention shown in FIGS. 5 and 6, fluid-handling system 150 includes a barometric trap 164 and a gas manifold 170. As is typical of the prior art, barometric trap 164 includes conduits 161 and 162 that communicate with a landfill wellhead 163 that is typically located above ground level 135. According to existing art, conduits 161 and 162 provide the intake and outtake, respectively, of the fluid trap provided by the u-shaped trap 164. As is also conventional, trap 164 is connected to gas manifold 170 via conduit 162. Trap 164 typically functions as a liquid-gas separation and fluid flow-regulating device. Gases typically rise in conduit 161 and liquids settle in conduit 160. Wellhead 163 typically includes a gas flow control device, for example, a flow control valve, that regulates the flow of gas from conduit 161 to 162 to then to manifold 170. The flow control device in wellhead 163 also regulates the vacuum applied to conduits 161, 132, 232, and 332. Typically, a vacuum or underpressure is provided in manifold 170, for example, about 30-40 inches of water vacuum. The vacuum in manifold 170 is communicated to conduit 162 and is regulated by the valve in wellhead 163. The vacuum in conduit 161 is typically lower than the vacuum in conduit 162, for example, about 15 to 20 inches of water. Thus, the height of the liquid in trap 164 is typically higher in conduit 162 than in conduit 161, as indicated by the difference in liquid level D in FIG. 5. When the level of liquid rises in conduit 162 and reaches the elevation of manifold 170, the liquid in conduit 162 enters manifold 170 with the gas from conduit 162, and the gas and liquid are forwarded via manifold 170 to the gas and liquid collection and treatment systems (not shown). Also, according to the existing art, manifold 170 is in fluid communication with the main landfill vacuum system. Manifold 170 forwards gas and liquid to a central manifold that collects gas and liquid from other landfill conduits and forwards these gases and liquids to treatment or processing, for example, to a centrally-located energy recovery system, gas treatment system, or disposal system. In one aspect of the invention, conduits 132, 232, and 332 discharge to one or more conduits 175, for example, a common conduit 175, which is in fluid communication with fluid handling system 150. As shown in FIGS. 5 and 6, one or more conduits 175 may pass through end wall 144. (See the description of FIGS. 16 and 17 for a more complete description of wellhead 163 and barometric trap 164 and a description of their operation.)

System 133 shown in FIGS. 5 and 6 may typically include all the features and constructions of system 33 shown in FIGS. 3 and 4. Specifically, at least some, typically all, of the conduits 132, 232, and 332 may include at least one access port 152, 252, and 352, respectively. Access ports 152, 252, and 352 may typically have the design and features of access port 52 shown in FIGS. 3 and 4. In one aspect of the invention, at least one of the access ports 152, 252, and 352 comprise a standard "wye" pipe coupling. Also, system 133 may include at least one flow regulating device or valve 136, 236, and 336, for example, similar to flow regulating device 36, for instance, a butterfly-type valve, a ball-type valve, a gate-type valve, or their equivalent. Valves 136, 236, and 336 may be manually operated or automatedly operated by means of an automated valve controller (not shown). In addition, system 133 may also include one or more couplings or unions 156, 256, and 356 similar to union 56 at one or more appropriate locations as described with respect to union 56.

Also, conduits 132, 232, and 332 may be flexible, for example, sufficiently flexible to allow lifting, bending, and deflection of conduits 132, 232, and 332 to manipulate and facilitate maintenance and servicing of system 133 and its components. Again, similar to conduit 32, conduits 132, 232, and 332 and their respective access port conduits may comprise metallic or non-metallic conduits. Enclosure 134 may also be non-metallic, for example, enclosure 134 may be made, from plastic, for instance, PVC plastic, PE plastic, HDPE plastic, PE plastic, PP plastic, polyester, or their equivalents. Enclosure 134 may also be made from wood, for example, pressure treated wood. Enclosure 134 may include structural reinforcing members, for example, gussets, stays, cross beams, and the like, as needed to ensure the structural integrity of the enclosure and, for example, prevent collapse of the side or end walls.

In addition to having essentially all the features of system 33, system 133 may also have specific features associated with having multiple conduits 132, 232, and 332 and having protective conduit 131 through which conduits 132, 232, and 332 pass. According to the aspect of the invention shown in FIGS. 5 and 6, conduits 132, 232, and 332 and protective conduit 131 pass through end wall 142 of enclosure 134. Therefore, in order to minimize or prevent leakage of fluids, that is, gases and/or liquids, into enclosure 134, in one aspect of the invention, some form of fluid seal may be provided between the outside surfaces of conduits 132, 232, and 332 and the inside surface of protective conduit 131. Also, in one aspect of the invention, some form of fluid seal may be provided between the outside surface of protective conduit 131 and the penetration through the end wall 142. For example, these fluid-tight seals may be provided by means of welding, by means of an adhesive, or by means of some form of elastomeric sealing medium, for example, silicone rubber. According to one aspect of the invention, a fluid-tight seal is provided between the outside surfaces of conduits 132, 232, and 332 and the inside surface of protective conduit 131 by means of barrier or plate 180, for example, a metallic or plastic circular plate having an outer diameter that conforms to and mates with the inside diameter of protective conduit 131 and includes a plurality of through holes through which conduits 132, 232, and 332 pass. The joints between the mating surfaces may be sealed with a welding, an adhesive, or with some form of elastomeric sealing medium, for example, silicone rubber.

Similarly, according to one aspect of the invention, a fluid-tight seal may provided between the outside surfaces of conduits 132, 232, and 332 and the inside surface of conduit 175 and a fluid-tight seal may be provided between the outside of conduit 175 and the inside of the penetration through end wall 144. As shown in FIGS. 5 and 6, the fluid tight seal between conduits 132, 232, and 332 may be provided by a barrier or plate 182, for example, a metallic or plastic circular plate having an outer diameter that conforms to and mates with the inside diameter of conduit 175 and includes a plurality of through holes through which conduits 132, 232, and 332 pass. Again, the joints between the mating surfaces may be sealed with a welding, an adhesive, or with some form of elastomeric sealing medium, for example, silicone rubber.

Another aspect of the invention is shown in FIGS. 7 and 8. FIG. 7 illustrates a side elevation view, partially in cross-section, of another system 233 that can be used to service landfill conduits. FIG. 8 illustrates a plan view, partially in cross-section, of system 233 shown in FIG. 7. System 233 may be similar to and include all the features and structures of systems 33 and 133 discussed previously. In this aspect of the invention, system 233 comprises enclosure 234 into which is introduced at least one conduit 432, 532, and 632 which emanate from a landfill (not shown), for example, a landfill similar to landfills 12 and 22 discussed previously. Conduits 432, 532 and 632 may be encased within a protective conduit 231. As shown in FIGS. 7 and 8, in one aspect of the invention, conduits 432, 532 and 632 may not lie in the same plane, for example, conduits 432, 532 and 632 may be arranged in any configuration as they are introduced to system 233. For example, conduits 432, 532 and 632 may be stacked in a two dimensional array, for example, a triangular, a square, or a rectangular array, as they are interface with system 233. According to this aspect of the invention, conduits 432, 532, and 632 transition, for example, uniformly transition, from a first array of conduits to a second array of conduits, for example, conduits 732, 832, and 932 arranged side by side in a single plane. In one aspect of the invention, conduits 732, 832, and 932 comprise service conduits. Again, similar to earlier aspects, conduits 732, 832, and 932 may discharge to a landfill fluid handling system (not shown), such as system 150 shown in FIGS. 5 and 6.

Enclosure 234 may be similar to and have all the properties and dimensions of enclosure 34 and 134 discussed previously. Enclosure 234 typically includes a first end wall 242, a second end wall 244 opposite first end wall 242, and side walls 246 (only one of which is shown in FIG. 7). Though not required in one aspect of the invention, enclosure 234 may also include a floor or base 248 (shown in phantom). Enclosure 234 may also include a removable cover 249 similar to covers 49 and 149. Similar to enclosures 34 and 134, enclosure 234 may also be at least partially buried. Also, similar to systems 33 and 133, system 233 typically includes at least one access port 352 in at least one of conduits 732, 832, and 932 having the design and features of access ports 52 and 152, for example, a standard "wye" pipe coupling. Also, system 233 may include at least one flow regulating device or valve 436, for example, similar to flow regulating device 36 and system 233 may also include one or more couplings or unions 456 similar to union 56 at one or more appropriate locations as described with respect to union 56.

According to this aspect of the invention, at least one of the end walls 242 and 244 and side walls 246 are not perpendicular to base 248. In one aspect of the invention, enclosure 234 comprises a frusto-conical enclosure having downwardly expanding sidewalls. For example, as shown in FIGS. 7 and 8, end walls 242 and 244 and side walls 246 may make an angle α with the vertical, for example, an angle a between about 5 degrees and about 45 degrees, for instance, between 10 degrees and about 20 degrees, for example, about 12 degrees.

According to this aspect of the present invention, conduits 432, 532, and 623 pass through first end wall 242 and are adapted to pass through second end wall 244 and access a landfill fluid handling system. As described with respect to FIGS. 5 and 6 above, according to one aspect of the invention, some form of fluid seal may be provide between the outside diameters of conduits 432, 532, and 623 and the inside diameter of protective conduit 231 and between the outside diameter of protective conduit 231 and the inside of the penetration through end wall 242. According to the aspect of the invention shown in FIGS. 7 and 8, sealing transition piece 280 may be used to seal and transition conduits 432, 532, and 632 to conduits 732, 832, and 932. According to one aspect of the invention, transition piece 280 provides a housing for the transition of conduits 432, 532, and 632 from one array, for example, a stacked rectangular array of conduits, to a second array of conduits 732, 832, and 932, for example, a linear array of conduits.

Detailed views of transition piece, or flared expansion, 280 are shown in FIGS. 9 and 10. FIG. 9 is a side view, partially in cross-section, of a transition piece 280 that may be used in system 233 of FIGS. 7 and 8. FIG. 10 is a side view of transition piece 280 as viewed along lines 10-10 in FIG. 9. As shown in FIG. 9, transition piece 280 includes a first end 282 comprising an inlet 283, a main body 281, and a second end 284 comprising a plurality of outlets 285, 286, and 287. Though in FIGS. 9 and 10 second end 284 includes three outlets, in one aspect of the invention, second end 284 may comprise at least one outlet, for example, outlet 286. According to this aspect of the invention, inlet 283 may have any cross-sectional shape, for example, inlet 283 may be circular, oval, elliptical, triangular, square, rectangular, or any polygonal shape, for instance, any polygonal shape having smooth radiused corners. The shape of inlet 283 may typically be dictated by the shape of the array of conduits, for example, conduits 432, 532, and 632, passing through inlet 283. In one aspect of the invention, as shown in FIGS. 7 and 8, inlet 283 may have the same shape as and mate with protective conduit 231, for example, circular in cross-section. In one aspect of the invention, conduit 231 and inlet 283 are mated to provide a uniform, fluid-tight seal, for example, by means of welding, an adhesive, or a mechanical coupling, for instance, an elastomeric coupling provided by Fernco, Inc. of Davison, Mich., or its equivalent.

According to this aspect of the invention, second end 284 is shaped wherein the outlets 285, 286, and 287 can be mated to conduits 732, 832, and 932 (see FIGS. 7 and 8). For example, in one aspect of the invention, second end 284 may be shaped to permit the mating of outlets 285, 286, and 287 to a linear or planar array of conduits 732, 832, and 932. Second end 284 may be circular, oval, elliptical, triangular, square, rectangular, or any polygonal shape, for instance, any polygonal shape having smooth radiused corners. As shown in FIG. 10, second end 284 may be oval in shape to accommodate a linear array of outlets. Outlets 285, 286, and 287 may be circular or non circular in cross-section, for example, outlets 285, 286, and 287 may be oval, elliptical, triangular, square, rectangular, or any polygonal shape, for instance, any polygonal shape having smooth radiused corners.

One or more outlets 285, 286, and 287 may be located in end plate 288, for example, outlets 285, 286, and 287 may comprise through holes through end plate 288. As shown in FIG. 9, outlets 285, 286, and 287 may also comprise short lengths of conduit 295, 296, and 297 mounted in through holes in end plate 288. The axes of conduits 295, 296, and 297 may be parallel to each other or may be non-parallel to each other. For example, as shown in FIG. 9, the axis of at least conduit 295 may deviate from the axis of conduit 296 by an angle $\beta$ between about 3 degrees to about 30 degrees, for example, about 15 degrees.

According to one aspect of the invention, first end 282 may have a dimension, for example, an inside diameter, of between about 3 inches and about 24 inches, and is typically between about 6 and about 12 inches, for example, between about 9 and about 10 inches. Second end 284 may have a maximum dimension, for example, a major axis diameter, of between about 6 inches and about 48 inches, and is typically between about 12 and about 24 inches, for example, about 18 and about 20 inches. Second end 284 may have a minimum dimension, for example, a minor axis diameter, of between about 3 inches and about 24 inches, and is typically between about 6 and about 12 inches, for example, about 10 and about 12 inches. Outlets 285, 286, and 287 may have a dimension, for example, an inside diameter, of between about 1 inch and about 24 inches, and may typically between about 3 and about 12 inches, for example, about 4 and about 6 inches. Outlets 285, 286, and 287 may have the same dimensions or the dimension of at least one of the outlets may vary. For example, in one aspect of the invention outlets 285 and 287 may be smaller than outlet 286, for instance, outlets 285 and 287 may have an inside diameter of about 4 inches and outlet 286 may have an inside dimension of about 6 inches. End plate 288 may have a thickness of between about ⅛ inch and about 3 inches, and may typically between about ½ inch and about 1 inch, for example, about ¾ inch.

Transition piece 280 may be metallic or non-metallic. In one aspect of the invention at least some of transition piece 280 may be made from metal, for example, iron, steel, or aluminum, among other metals. In another aspect of the invention, at least some of transition piece 280 may be made from a non-metal, for example, plastic, such as, polyethylene (PE), polypropylene (PP), polyester (PE), and acrylonitrile butadiene styrene (ABS), among other plastics. In one aspect of the invention, at least some parts of transition piece 280 may be made from high-density polyethylene (HDPE). For example, main body 281 may be formed from a HDPE reducer, for example, a 10 inch by 14 inch reducer. Main body 281 may formed by heat forming a HDPE reducer, for example, over a suitably shaped die or mandrel. In one aspect of the invention, end plate 288 and conduits 295, 296 and 298 may be made from HDPE.

According to this aspect of the invention, main body 281 of transition piece 280 may be formed to provide a uniform transition from first end 282 to second end 284, for example, main body may be circular adjacent first end 282 and may be oval adjacent to second end 284. However, main body 281 may take any appropriate shape to provide a uniform transition from first end 282 to second end 284.

According to another aspect of the invention, conduits 732, 832, and 932 penetrate second end wall 244 while housed in a protective transition piece 290 (See FIGS. 7 and 8), for example, a transition piece similar to transition piece 280 disclosed and described with respect to FIGS. 9 and 10. According to one aspect of the invention, conduits 732, 832, and 932 may be mated to transition pieces 280 and 290 to provide a fluid type seal by conventional means, for example, by means of welding, an adhesive, or a mechanical coupling. As shown in FIGS. 7 and 8, conduits 732, 832, and 932 may be connected to transition pieced 280 and 290 by means of one or more elastomeric couplings 260, for example, elastomeric couplings provided by Fernco, Inc., or their equivalent.

According to aspects of the present invention, system 33, 133, and 233 provide the maintenance or service provider with an improved capability of accessing and servicing landfill laterals, for example, the purging or evacuation of laterals obstructed by solids, liquids, or gases, compared to prior art methods. For example, according to one aspect of the invention, with reference to FIGS. 7 and 8, when the landfill conduit connected to conduit 732 requires repair or maintenance due, for example, to the presence of an obstruction, maintenance personal may readily access enclosure 234 via door 249 and, for example, isolate conduit 732 from the landfill fluid handling system by closing valve 436. With conduit 732 thus isolated, the interior of conduit 732 may be accessed via access port 352. According to this aspect of the invention, conduit 732 may be accessed and serviced while conduits 832 and 923 continue to operate, that is, continue to forward fluids to, for example, the fluid handling system 150. Maintenance personnel may then service the landfill conduit connected to conduit 732, for example, by visual (for example, remote closed-circuit television (CCTV)) or manual inspection, or by inserting hoses for injecting high-pressure fluids or for extraction fluids using vacuum, without disrupting the operation of conduits 832 and 932. When the servicing of the conduit connected to conduit 732 is completed, access port 352 may be closed, valve 436 opened to allow flow through conduit 732 to fluid the handling system, and another conduit may be isolated and serviced, for example, conduit 832 or 932. Other methods of servicing the landfill conduits connected to conduits 732, 832, and 932 that will be facilitated by aspects of the present invention will be discussed below with respect to other aspects of this invention.

FIG. 11 illustrates another aspect of the present invention. FIG. 11 is a schematic diagram of an apparatus 300 for servicing one or more landfill conduits. According to this aspect of the invention, apparatus 300 may be used to service landfill conduits, for example, for removing obstructions, for instance, solids, liquids, gases, or their combination, from one or more landfill conduits. In one aspect of the invention, apparatus 300 may be used in conjunction with system 33, 133, or 233 discussed above to access and service one or more landfill conduits.

According to this aspect of the invention, apparatus 300 includes at least one fluid pressurizing device 302 having an inlet 304 and a pressurized fluid outlet 306. The fluid handled by fluid pressurizing device 302 may be a liquid, gas, or a combination of a liquid and gas. Fluid pressurizing device 302 may be any type of device that is adapted to receive a fluid at one pressure and discharge the fluid at a second pressure, higher than the first pressure. Fluid pressurizing device 302 may, for example, be a blower or a pump, for example, a liquid-ring vacuum pump or compressor, among other devices. Though any type of fluid pressurizing device may be used for aspects of the present invention, in the following discussion, the term "blower" will be used for pressuring device 302 to facilitate the description of this aspect of the invention.

Apparatus 300 also includes at least one conduit 308 operatively connected to the inlet 304 or outlet 306 of blower 302. According to this aspect of the invention, conduit 308 is in fluid communication with at least one landfill conduit 310 where fluids can be introduced to the landfill conduit or removed from the landfill conduit, for example, landfill conduit 310 may comprise landfill conduit 32, 132, or 432 discussed above. In one aspect of the invention, one end of conduit 308 may be connected to inlet 304 and the other end of conduit 308 may be in fluid communication with a landfill conduit 310 wherein blower 302 produces a pressure lower than atmospheric pressure (for example, a vacuum) in conduit 308 which draws fluid out of the landfill conduit 310. In another aspect of the invention, one end of conduit 308 may be placed in fluid communication with outlet 306, for example, via conduit 309 shown in phantom in FIG. 11, and the other end of conduit 308 may be in fluid communication with a landfill conduit 310 wherein blower 302 introduces a pressurized fluid into conduit 308 and also into landfill conduit 310. The source of the fluid may be fluid source 312 (shown in phantom) which may be connected to inlet 304 of blower 302 via conduit 314 (also shown in phantom).

Apparatus 300 may also include a plenum 316 (shown in phantom) positioned between landfill conduit 310 and inlet 304. According to this aspect of the invention, when a fluid is removed from landfill conduit 310 by blower 302 providing an under pressure (or vacuum) in conduit 308, at least some of the fluid may be drawn into plenum 316 prior to being drawn into blower 302. For example, in one aspect of the invention, the fluid drawn from landfill conduit 310 may include a liquid and a gas, wherein when the liquid and gas are drawn into plenum 316 by blower 302, at least some of the liquid may be separated from the gas before the fluid is drawn into blower 302. Thus, in one aspect of the invention plenum 316 comprises a device for separating liquid from a fluid stream containing gas and liquid.

In another aspect of the invention, outlet 306 of blower 302 may be operatively connected to a fluid treatment process 320 (shown in phantom) via conduit 318. Fluid treatment process 320 may be any process for treating a fluid stream discharged from blower 302. Fluid treatment process 320 may comprise storage, disposal, discharge to atmosphere, chemical treatment, scrubbing, combustion, or any other conventional treatment or handling that landfill fluids may be treated by.

Figure 12:
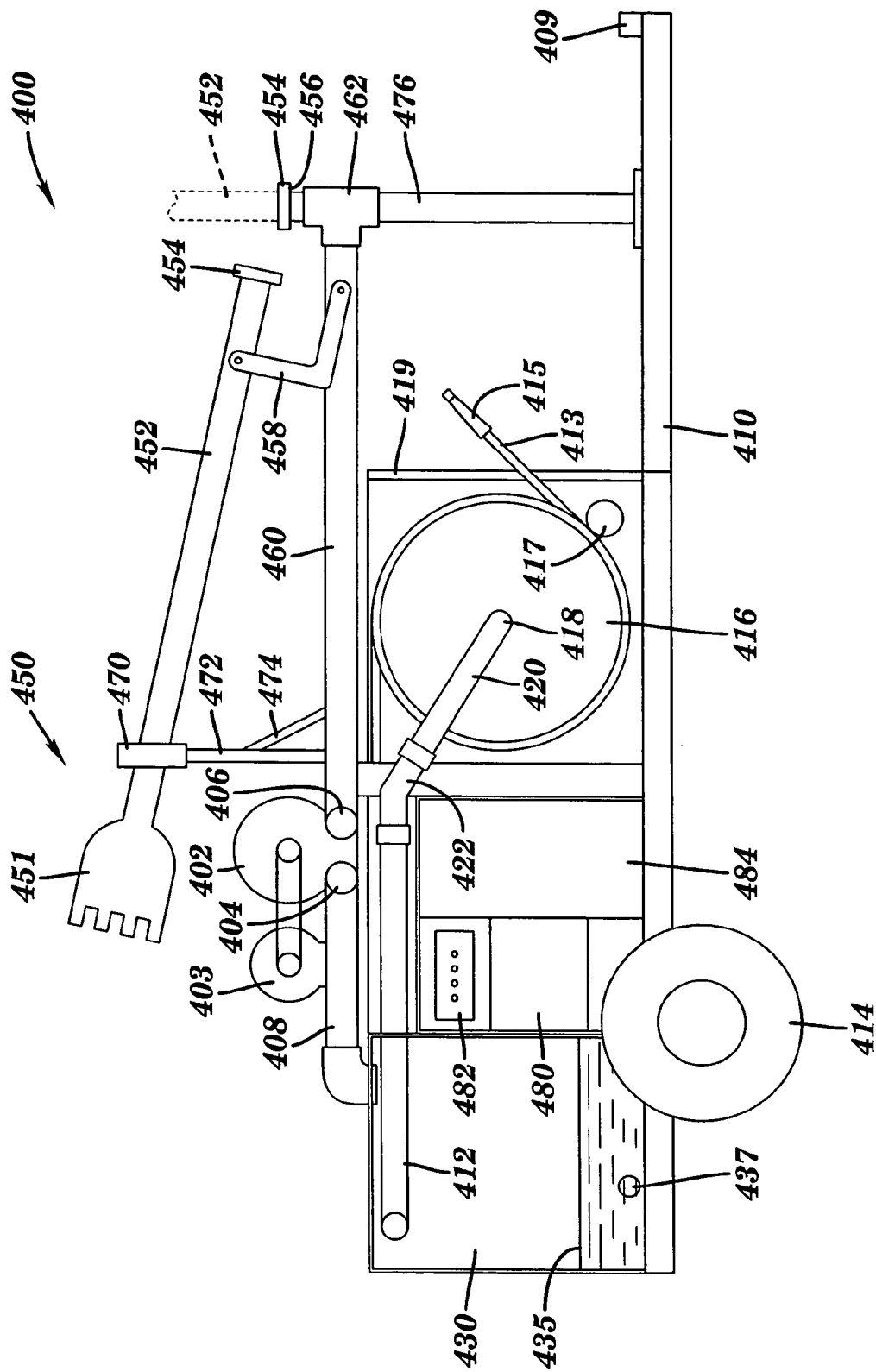
FIG. 12 is a side elevation view of a landfill conduit service apparatus according to another aspect of the present invention.
Figure 13:
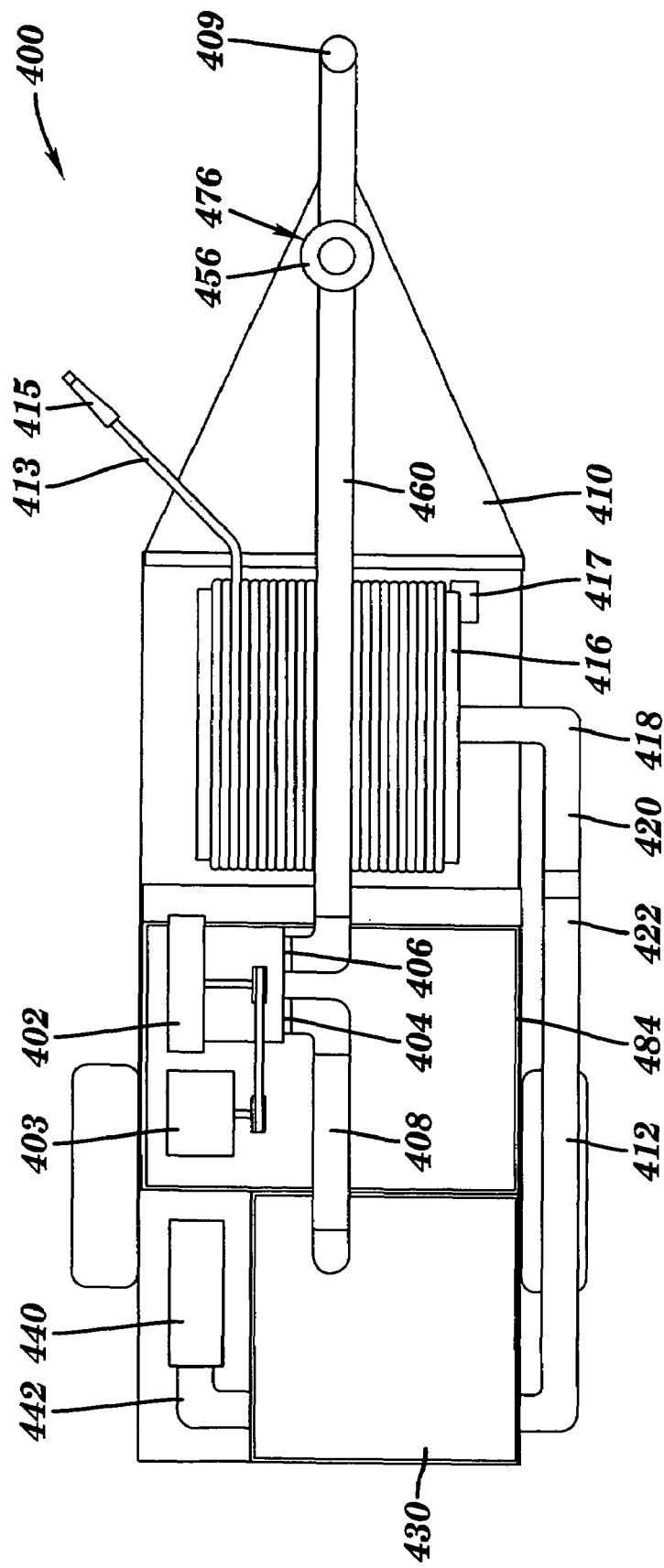
FIG. 13 is a plan view of the landfill conduit service apparatus shown in FIG. 12.

FIGS. 12 and 13 illustrate another aspect of the present invention. FIG. 12 illustrates a side elevation view of an apparatus 400 for servicing a landfill conduit that comprises a specific embodiment of the apparatus 300 shown in FIG. 11. FIG. 13 illustrates a plan view of apparatus 400 shown in FIG. 14. According to one aspect of the invention, apparatus 400 may be used in conjunction with systems 33, 133, and 233 to service one or more landfill conduits. According to this aspect of the invention, apparatus 400 comprises a portable apparatus mounted on trailer frame 410 having a trailer hitch 409 and two or more wheels 414. Apparatus 400 includes a blower 402 having an inlet 404 and an outlet 406. Blower 402 may be driven by a motor 403, for example, an electric or hydraulic motor, for instance, directly belt driven by motor 503. In one aspect of the invention blower 402 is at least a 30 Hp blower having a free air flow capacity of at least about 518 cubic feet per minute and a vacuum capacity of at least about 27 inches of mercury. In one aspect of the invention, blower 402 is an Aqualine Model 1100 liquid-ring compressor/vacuum pump provided by Gardner Denver Wittig of Peachtree, Ga., or its equivalent, though other types of fluid pressurizing devices may be used. In one aspect of the invention, apparatus 400 may also include a generator (not shown), for example, a diesel- or gasoline-engine powered electric or hydraulic generator, for powering motor 403. The generator may be mounted on, near, adjacent to, or distal trailer frame 410.

In this aspect of the invention, blower 402 is in fluid communication with at least one landfill conduit (not shown), for example, landfill conduit 32, 132, 332, or 632. In one aspect of the invention blower 403 may be in fluid communication with a predetermined location within a landfill conduit, for example, a location at which an obstruction is located. In one aspect of the invention, the landfill conduit is in fluid communication with inlet 404 wherein blower 402 creates an under-pressure (or sub-atmospheric pressure or vacuum) in the landfill conduit to draw a fluid out of the landfill conduit. Again, the fluid may be a liquid, a gas, or a combination of a liquid and a gas. In another aspect of the invention, the landfill conduit may be in fluid communication with outlet 406 wherein blower 402 introduces a pressurized fluid to the landfill conduit.

In one aspect of the invention, apparatus 400 may include at least one first conduit 408 connected to inlet 404 of blower 402. Apparatus 400 may also include at least one second conduit 412 in fluid communication with first conduit 408 and also in fluid communication with a landfill conduit. In one aspect of the invention, second conduit 412 may be in fluid communication with a landfill conduit by means of a hose 413, for example, a flexible hose. Hose 413 may have a nozzle 415. In one aspect of the invention, hose 413 may be mounted on a hose reel 416. Hose reel 416 may be driven by an electric or hydraulic motor 417 for unwinding or winding hose reel 416. In one aspect of the invention hose reel 416 may be provided by Hannay Reel Company of Westerlo, N.Y., or its equivalent, though other types of hose reels may be used. Hose reel 416 may be mounted on structural frame 419 as appropriate. Hose reel 416 may have a centrally positioned outlet 418. Second conduit 412 may be connected to hose reel outlet 418 by means of a third conduit 420, for example, a flexible hose. An elbow 422 may also be positioned between second conduit 412 and third conduit 420, for example, a 45 or 90-degree elbow.

In one aspect of the invention, a plenum 430 may be positioned between the landfill conduit being serviced and blower 402. As shown in FIGS. 12 and 13, plenum 430 may be positioned between first conduit 408 and second conduit 412. Plenum 430 may comprise a liquid dropout tank. As described with respect to plenum 316 in FIG. 11, plenum 430 may be provided to separate at least some liquid from the stream of liquid and gas that may be drawn from the landfill conduit by blower 402. According to this aspect of the invention, the liquid separated from the fluid drawn from the landfill conduit may settle on the bottom of plenum 430 as indicated by water level 435. Plenum 430 may include a drain hole 437. In one aspect of the invention, apparatus 400 may also include a liquid discharge pump 440 having an inlet connected to drain hole 437 view conduit 442. Liquid 435 may be transferred by discharge pump 440 to treatment or disposal, as appropriate. Plenum 430 may comprise any appropriately sized plenum or tank, for example, a rectangular or circular cylindrical tank or vessel, or a spherical tank or vessel. Plenum 430 may typically have a capacity of at least 50 gallons, for example, between about 50 and about 400 gallons. Plenum 430 may be metallic, for example, carbon steel or stainless steel, or non-metallic, for example, plastic, such as polyethylene (PE), polypropylene (PP), polyester (PE), and acrylonitrile butadiene styrene (ABS), among other plastics.

Apparatus 400 may also include some form of means for treating the fluids removed from the landfill conduit. In one aspect of the invention, apparatus 400 includes a combustible gas burning flare assembly 450. Flare assembly 450 may include a burning device 451 which may comprise the burning device disclosed in commonly-assigned U.S. Pat. No. 5,957,681 (the disclosure of which is included by reference herein) that is marketed under the registered trademark Solar Spark® by Landfill Service Corporation, though other types of burning devices may be used for this aspect of the invention. In the aspect of the invention shown in FIGS. 12 and 13, flare assembly 450 may also include a conduit 452 having mounting flange 454. Mounting flange 454 may be removably mounted on mating flange 456. In the aspect of the invention, flare assembly 450 may be rotatably mounted to frame 410 by means of mounting linkage 458. As shown in phantom in FIG. 12, flare assembly 450 may be rotated on mounting linkage 458 wherein flange 454 mounts on flange 456. Flanges 454 and 456 may be fastened together with conventional mechanical fasteners, for example, one or more bolts and nuts. An elastomeric sealing material, for example, a rubber gasket, may be positioned between mating flanges 454 and 456 to minimize fluid leakage.

According to this aspect of the invention, apparatus 400 includes a conduit 460 that is connected to the pressurized outlet 406 of blower 402 and communicates with flare assembly 450. For example, as shown in FIGS. 12 and 13, conduit 460 is connected to a tee section 462 upon which flange 456 is mounted. Mounting linkage may be mounted to conduit 460 or to structural frame 419. When flare assembly 450 is rotated into the vertical position (shown in phantom), fluids, particularly, combustible gases, such as methane, hydrogen sulfide, and mercaptan, may be discharged from blower 402 and passed to flare assembly 450 for burning.

As shown in FIGS. 12 and 13, apparatus 400 may include a cradle assembly 470 for supporting flare assembly 450 when flare assembly is in the inclined position. Cradle assembly 470 may include appropriate structural supports 472, 474, as needed. Apparatus 400 may also include support post 476 mounted on frame 410. Tee 462 may be mounted to support post 476 whereby support post 476 supports flare assembly 450 when flare assembly 450 is rotated in its vertical position. For ease of illustration, flare assembly 450 is not shown in FIG. 13.

According to aspects of the invention, apparatus 400 may include miscellaneous ancillary equipment and storage cabinets. For example, apparatus 400 may include one or more electrical cabinets 480; one or more control panels 482, for example, a control panel for controlling the operation of motors 403 and 417; or one or more storage cabinets 484, for example, for storage of a remote sensing device for example, a video camera or closed circuit television camera. In one aspect of the invention, the remote sensing device may be inserted into the landfill conduit to inspect the inside of the landfill conduit, for example, visually inspect the inside of the landfill conduit to, among other things, identify the location of any obstructions.

In one aspect of the invention, the conduits and support structures on apparatus 400 may be metallic or non-metallic. For example, the conduits and support structures may be metallic, for example, made from iron, steel, aluminum, or other structural metal. The conduit and support structures may also be non-metallic, for example, made from plastic, such as polyethylene (PE), high-density polyethylene (HDPE), polypropylene. (PP), polyester (PE), or acrylonitrile butadiene styrene (ABS), among other plastics. In one aspect of the invention, the conduits and support structures of apparatus 400 may be made from steel. The conduits in apparatus 400 may have nominal diameters from 1 inch to about 12 inches, and typically have nominal diameters between about 2 inches and about 6 inches. For example, in one aspect of the invention, conduits 408, 412, 422, 420, 452 and 460 and support post 476 may be made from 4-inch steel pipe. However, in other aspects of the invention, one or more of these conduits may be non-metallic, for example, they may be made from PVC or HDPE pipe, or their equivalent.

The approximate over-all length of apparatus 400 may be from about 10 feet to about 30 feet, but is typically about 16 feet in length. The approximate height of apparatus 400, without wheels 414 or flare assembly 450, may be from about 3 feet to about 10 feet, but is typically about 6 feet in height. The approximate width of apparatus 400 may be from about 3 feet to about 8 feet, but is typically about 6 feet in width.

Figure 15:
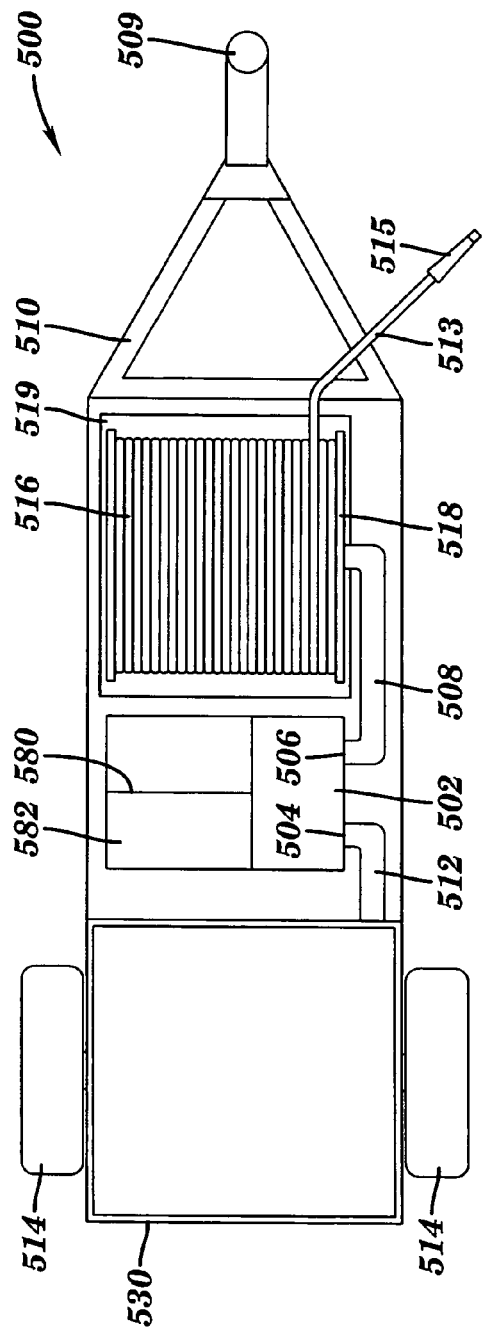
FIG. 15 is a plan view of the landfill conduit service apparatus shown in FIG. 14.
Figure 14:
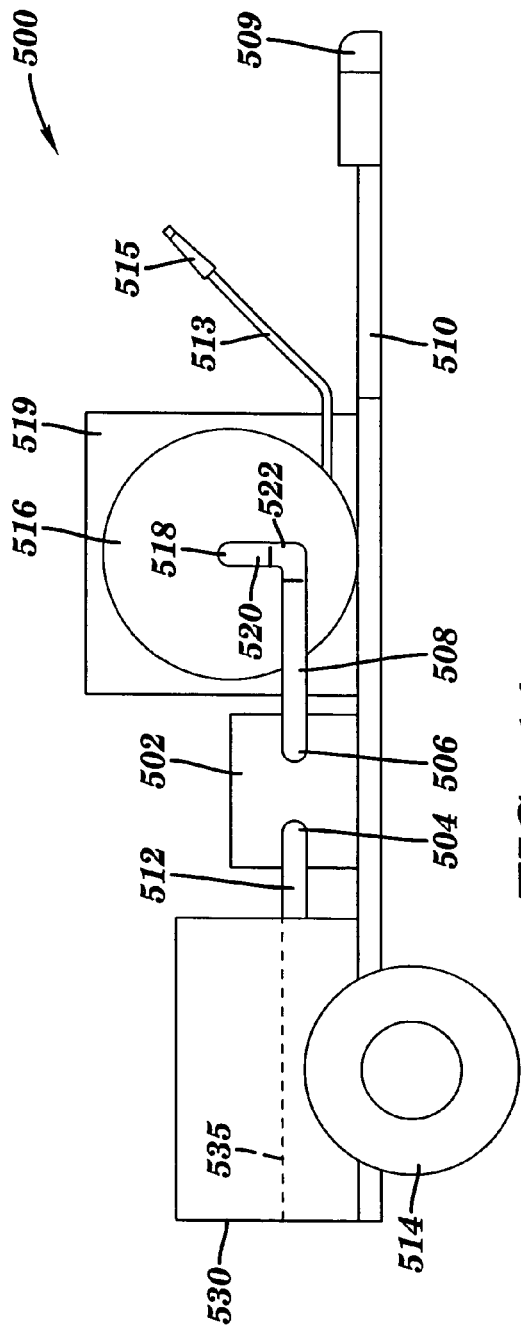
FIG. 14 is a side elevation view of another landfill conduit service apparatus according to another aspect of the present invention.

FIGS. 14 and 15 illustrate another aspect of the present invention. FIG. 14 illustrates a side elevation view of an apparatus 500 for servicing a landfill conduit that comprises a specific embodiment of the apparatus 300 shown in FIG. 11. FIG. 15 illustrates a plan view of apparatus 500 shown in FIG. 14. According to one aspect of the invention, apparatus 500 may be used in conjunction with systems 33, 133, and 233 to service one or more landfill conduits. According to this aspect of the invention, apparatus 500 comprises a portable apparatus mounted on trailer having a frame 510 having a trailer hitch 509 and two or more wheels 514. Apparatus 500 includes a pump 502, for example, a high-pressure pump, having an inlet 504 and an outlet 506. Pump 502 may be driven by an electric or hydraulic motor (not shown), for example, belt driven by an electric motor. In one aspect of the invention pump 502 is at least a 20 Hp pump having a capacity of at least 4 gallons per minute (gpm) and at least about 3500 psig. In one aspect of the invention, pump 502 is a fluid-handling pump provided by General Pumps of Mendota Heights, Minn., or its equivalent, though other types of fluid pressurizing devices may be used. In one aspect of the invention, apparatus 500 may also include a generator (not shown), for example, a diesel- or gasoline-engine powered electric or hydraulic generator, for powering the motor which drives pump 502. The generator may be mounted on, near, adjacent to, or distal the trailer of apparatus 500.

In this aspect of the invention, pump 502 is in fluid communication with at least one landfill conduit (not shown), for example, landfill conduit 32, 132, 332, or 632. In one aspect of the invention pump 502 may be in fluid communication with a predetermined location within a landfill conduit, for example, a location at which an obstruction is located. In one aspect of the invention, the landfill conduit is fluid communication with outlet 506 wherein pump 502 introduces a fluid under super-atmospheric pressure to the landfill conduit to, for example, dislodge the obstruction.

In one aspect of the invention, apparatus 500 may include at least one first conduit 508 connected to outlet 506 of pump 502, conduit 508 being in fluid communication with a landfill conduit. Apparatus 500 may also include at least one second conduit 513 in fluid communication with first conduit 508 and also in fluid communication with a landfill conduit. In one aspect of the invention, second conduit 513 may comprise a hose, for example, a flexible hose. Hose 513 may have a nozzle 515. In one aspect of the invention, hose 513 may be mounted on a hose reel 516. Hose reel 516 may driven by an electric motor (not shown) for unwinding or winding hose reel 516. In one aspect of the invention hose reel 516 may be similar to or identical to hose real 416 shown in FIGS. 12 and 13 and may be provided by Hannay Reel Company of Waterlo, N.Y., or its equivalent, though other types of hose reels may be used. Hose reel 516 may be mounted on structural frame 519 as appropriate. Hose reel 516 may have a centrally positioned inlet 518. First conduit 508 may be connected to hose reel inlet 518 by means of a third conduit 520, for example, a flexible hose. An elbow 522 may also be positioned between first conduit 508 and third conduit 520, for example, a 45- or 90-degree elbow.

In one aspect of the invention, apparatus 500 includes a fluid storage tank or plenum 530 and have at least one conduit 512 that places tank 530 in fluid communication with pump inlet 504. As shown in FIGS. 14 and 15, plenum 530 may be mounted on trailer frame 510 and positioned adjacent pump 502. Tank 530 typically provides a source of fluid, for example, water having a level 535 to the inlet 504 of pump 502. Tank 530 may comprise any appropriately sized plenum or tank, for example, a rectangular or circular cylindrical tank or vessel, or a spherical tank or vessel. Tank 530 may typically have a capacity of at least 50 gallons, for example, between about 50 and about 400 gallons. Tank 530 may be metallic, for example, carbon steel or stainless steel, or non-metallic, for example, plastic, such as polyethylene (PE), high-density polyethylene (HDPE), polypropylene (PP), polyester (PE), and acrylonitrile butadiene styrene (ABS), among other plastics.

According to aspects of the invention, apparatus 500 may include miscellaneous ancillary equipment and storage cabinets. For example, apparatus 500 may include one or more electrical cabinets 580; one or more control panels 582, for example, a control panel for controlling the operation of the motor or pump 502; or one or more storage cabinets (not shown), for example, for storage of remote sensing device, such as a remote video camera or closed circuit television camera. In one aspect of the invention, the remote sensing device may be inserted into the landfill conduit to inspect the inside of the landfill conduit, for example, visually inspect the inside of the landfill conduit to, among other things, identify the location of any obstructions.

In one aspect of the invention, the conduits and support structures on apparatus 500 may be metallic or non-metallic. For example, the conduits and support structures may be metallic, for example, made from iron, steel, aluminum, or other structural metal. The conduits and support structures may also be non-metallic, for example, made from plastic, such as polyethylene (PE), polypropylene (PP), polyester (PE), or acrylonitrile butadiene styrene (ABS), among other plastics. In one aspect of the invention, the conduits and support structures of apparatus 500 may be made from steel. The conduits in apparatus 500 may have nominal diameters from 1 inch to about 12 inches, and typically have nominal diameters between about 2 inches and about 6 inches. For example, in one aspect of the invention, conduits 508, 512, 513, 520, and 522 may be made from 4-inch steel pipe. However, in other aspects of the invention, one or more of these conduits may be non-metallic, for example, they may be made from PVC pipe, or its equivalent. The approximate over-all length of apparatus 500 may be from about 10 feet to about 30 feet, but is typically about 16 feet in length. The approximate height of apparatus 500, without wheels 514, may be from about 3 feet to about 10 feet, but is typically about 4 feet in height. The approximate width of apparatus 500 may be from about 3 feet to about 8 feet, but is typically about 4 feet in width.

Figure 16:
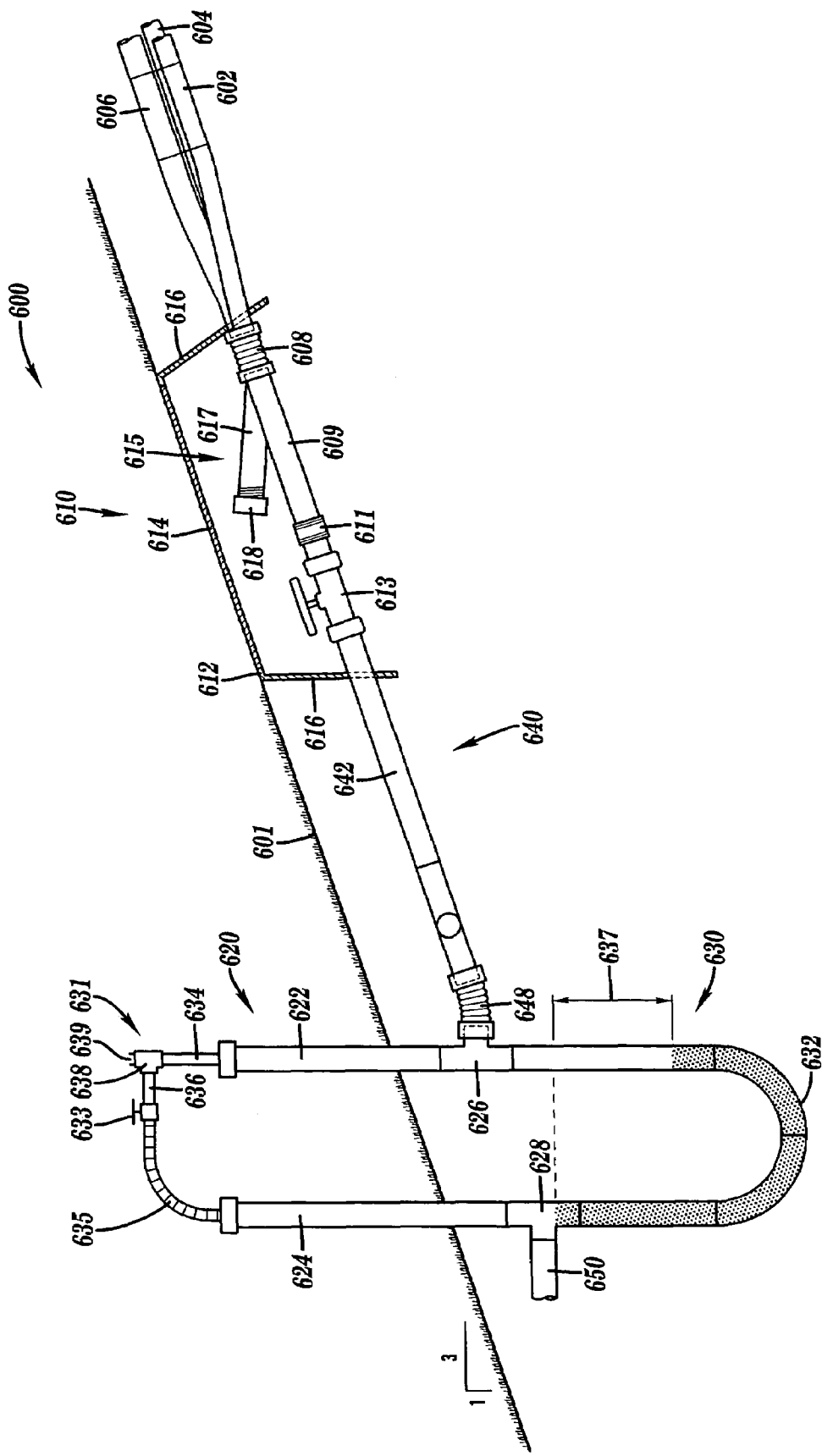
FIG. 16 is a side elevation view, partially in cross-section, of another aspect of the invention.
Figure 17:
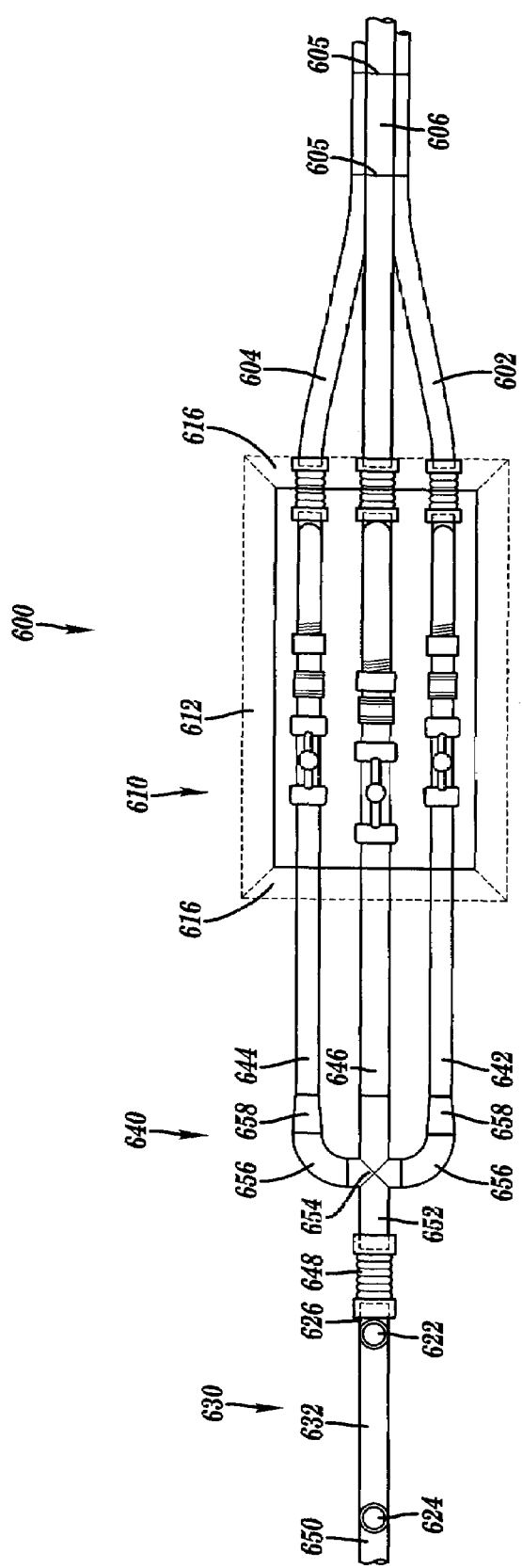
FIG. 17 is a plan view of the aspect of the invention shown in FIG. 16.

FIGS. 16 and 17 illustrate another system 600 for servicing landfill conduits, or laterals, according to another aspect of the present invention. FIG. 16 illustrates a side elevation view, similar to FIG. 5, of system 600 that according to one aspect of the invention may be used for servicing multiple landfill laterals. FIG. 17 is a plan view similar to FIG. 6 of the aspect of the invention shown in FIG. 16. According to this aspect of the invention, system 600 provides means for servicing one or more landfill laterals 602, 604, and 606 in a manner similar to which system 33 provides means for servicing lateral 32 shown in FIGS. 3 and 4 and system 133 provides means for servicing laterals 132, 232, and 332 in FIGS. 5 and 6.

Similar to earlier aspects of the invention, system 600 shown in FIGS. 16 and 17 includes a valve vault 610 which provides access to at least one lateral 602, 604, and 606. Similar to the aspects discussed above, laterals 602, 604, and 606 communicate with a landfill (not shown) and provide pathways for extracting (and in some aspects, introducing) fluids, that is, liquids and gases, from the landfill, for example, for disposal or treatment. Also, similar to earlier aspects of the invention, system 600 includes a wellhead assembly 620 and a barometric trap assembly 630 that communicate with a remote landfill gas collection or handling system (for example, a landfill manifold, not shown) via conduit 650. According to this aspect of the invention, system 600 includes a pipe-connector manifold 640 for connecting valve vault 610 with wellhead assembly 620 and barometric trap assembly 630. As shown in FIG. 16, system 600 may be positioned on an incline 601, for example, the side of a landfill having a pitch, for example, a 3-to-1 pitch, with the horizontal. In one aspect of the invention, system 600 may be provided on level ground.

According to one aspect of the invention, pipe-connector manifold 640 facilitates the installation and operation of landfill gas collection systems, for example, facilitates the installation and operation of landfill gas collection systems positioned on an incline. A detailed description of valve vault 610 is presented below with respect to FIGS. 19 and 20.

According to the aspect shown in FIGS. 16 and 17, valve vault 610 communicates with wellhead assembly 620 and barometric trap assembly 630. For ease of illustration, wellhead assembly 620 is not illustrated in FIG. 17. Wellhead assembly 620 may be a conventional wellhead assembly for landfills and barometric trap assembly 630 may be a conventional barometric trap for landfills, for example, wellhead assembly 620 and trap assembly 630 may be used to monitor and regulate the flow of landfill gases and liquids from a landfill, for example, from at least one lateral 602, 604, and 606. For example, as shown in FIG. 16, wellhead assembly 620 and trap assembly 630 may share common upright conduits 622 and 624. Conduit 622 communicates with landfill laterals and conduit 624 communicates with the landfill gas collection system via conduit 650. In the aspect of the invention shown in FIGS. 16 and 17, conduit 622 communicates with the landfill laterals via tee 626 and conduit 650 communicates with conduit 624 via tee 626.

According to conventional practice, an under-pressure or vacuum is provided in conduit 650, for example, about 30 to 40 inches of water. This under-pressure draws landfill liquids and gases from the laterals 602, 604, and 606 into wellhead assembly 620 and into barometric trap assembly 640 via tee 626. At tee 626, liquids introduced to conduit 622 settle in the u-shaped trap 632 and gases are drawn up to wellhead 620. Under the influence of the under-pressure provided in conduit 650, liquid in trap 632 is drawn downward into conduit 622 and upward in conduit 624, and into conduit 650, whereby a difference in liquid level 637 is provided in trap 632.

In wellhead assembly 620, upright conduits 622 and 624 communicate with each other via wellhead 631, valve 633, and conduit 635. Wellhead 631 typically includes an upright conduit 634, a lateral conduit 636, and a coupling 638. Coupling 638 typically includes one or more ports 639 adapted for mounting instrumentation, for example, instrumentation for monitoring the content and volume of gas flow through wellhead 631. Conduits 634 and 636 and coupling 638 may be conventional metallic or non-metallic pipe and pipe couplings. Valve 633 may be a typical valve used to regulate the flow of gas, for example, a ball valve or gate valve. Conduit 635 may be any conventional flexible or rigid conduit; however, in one aspect, conduit 635 may be a flexible rubber hose provided by Kanaflex Corporation of Lincoln, Nebr., or its equivalent.

According to conventional practice, valve 633 is regulated to control the volume of gas which passes through wellhead assembly 620 and also the volume of liquid that passes through barometric trap assembly 630. For example, in one conventional practice, the flow of gas through wellhead assembly 620 is monitored and regulated to minimize the amount of air, specifically, the amount of oxygen, passing through wellhead assembly 620. The gas flow and oxygen content are typically monitored by means of instrumentation mounted to ports 639 of coupling 638. Typically, the flow of gas is monitored and controlled to limit the amount of oxygen that is drawn into the landfill by the vacuum drawn through conduit 650. For example, according to conventional practice, the flow of oxygen into the landfill may be limited in order to limit the bioreactivity of the landfill, for example, to limit the generation of heat in the landfill. Where conduit 650 may be exposed to 30 to 40 inches of water vacuum, valve 633 may limit the vacuum in laterals 602, 604, and 606 to about 10 to 15 inches of water vacuum.

As shown in FIGS. 16 and 17, in one aspect of the invention, valve vault 610 communicates with wellhead assembly 620 and barometric trap assembly 630 via pipe-connector manifold 640. Manifold 640 combines the flow of fluids, that is, liquids and gases, flowing in conduits 642, 644, and 646 from valve vault 610 into a single flow and introduces the single flow to wellhead assembly 620 and barometric trap assembly 630. According to this aspect of the invention, the use and construction of this manifold is facilitated with the use of coupling 648, which, according to one aspect of the invention, may be a flexible coupling, for example, a flexible coupling provided by Novaflex of Toronto, Ontario, or its equivalent. According to this aspect of the invention, when coupling 648 is flexible, the mating of manifold 640 to tee 626 is facilitated. For example, though the orientation of conduits 642, 644, and 644 may typically be dictated by the slope or incline 601 of the installation, conduits 622 and 624 of wellhead assembly 620 and barometric trap assembly 630 typically must be vertically oriented or plumb (that is, within conventional installation tolerances) to, among other things, permit the desired liquid and gas separation and flow control. According to this aspect of the invention, providing a flexible coupling 648, for example, a single flexible coupling 648, allows the contractor to connect manifold 640 to wellhead assembly 620 and barometric trap assembly 630 with relative ease and without interfering with the desired vertical orientation of conduits 622 and 624.

According to this aspect of the invention, pipe-connector manifold 640 may assume a broad range of configurations and provide the desired invention. However, in one aspect of the invention, as shown in FIGS. 16 and 17, manifold 640 includes a plurality of conduits 642, 644, and 648, for example, at least two conduits. As shown most clearly in FIG. 17, manifold 640 is adapted to combine the flow of fluids in conduits 642, 644, and 646 into fewer conduits, for example, a single conduit 652. Again, though this combination of flow may be provided in numerous ways, one way to combine the flows in conduits 642, 644, and 646 includes providing at least one cross-shaped pipe section 654 and at least one, typically, at least two, elbows 656. For example, in one aspect, cross-shaped pipe section 654 may be connected to conduit 646 whereby the contents of conduit 646 flows into section 654 and elbows 656 may be connected to conduits 642 and 644 whereby the contents of conduits 642 and 644 also flow into cross-shaped pipe section 654. Thus, the flows of fluids from conduits 642, 644, and 646 are combined in cross-shaped pipe section 654 and passed to conduit 652. In one aspect of the invention, to avoid preference for the liquids flowing in conduit 646, an elbow 656 may also be attached to conduit 646 whereby the flow of fluid in conduit 646 is introduced to pipe section 654 at an angle, for example, perpendicular to the flows introduced by conduits 642 and 644. In another aspect of the invention, conduits 642, 644, and 646 may discharge to a common plenum and conduit 652 may communicate with the common plenum, for example, a circular or rectangular cylindrical plenum. In another aspect of the invention, as shown in FIG. 17, conduits 642 and 644 may also be attached to reducers 658 prior to communicating with section 654.

Figure 18:
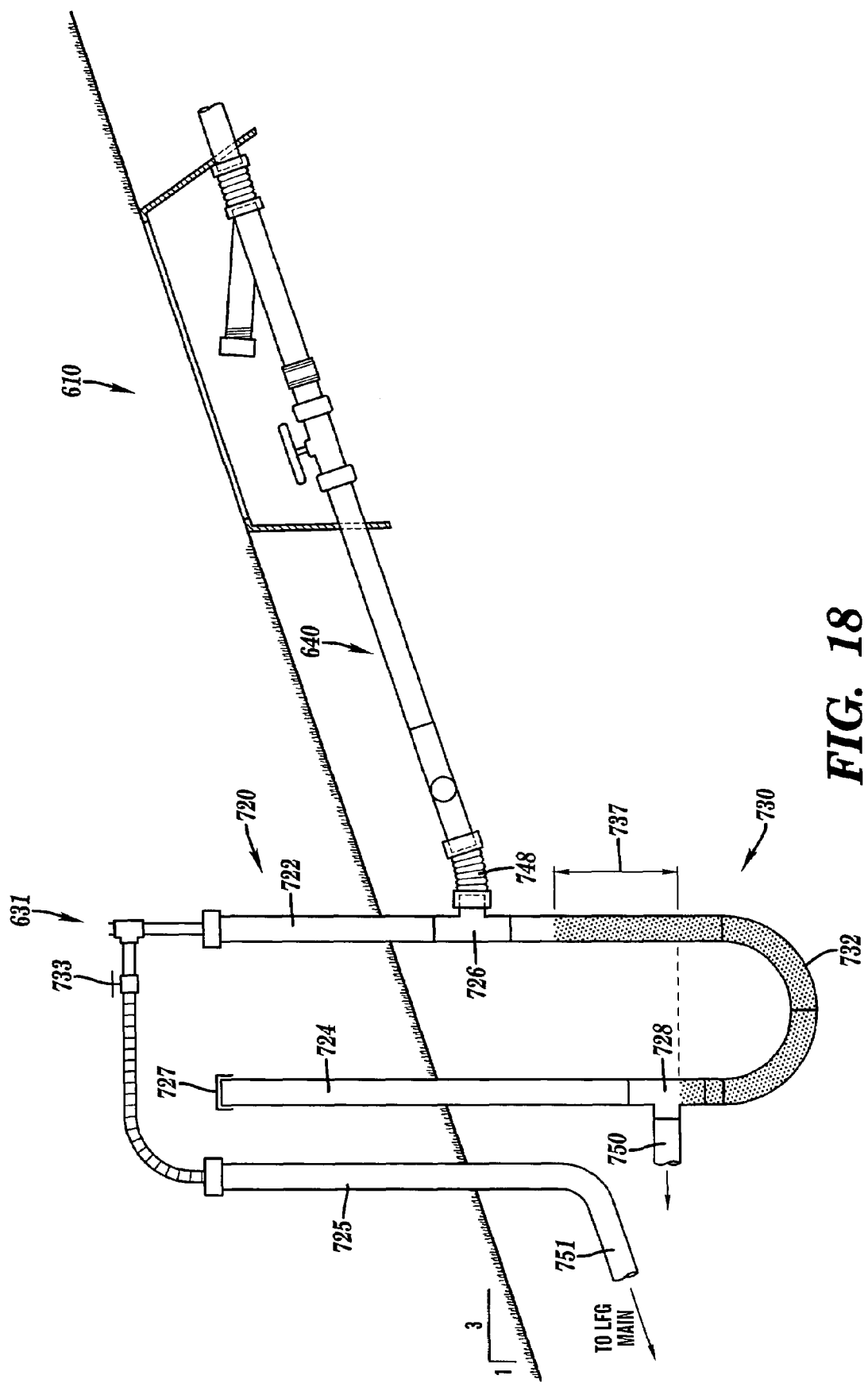
FIG. 18 is a side elevation view similar to FIG. 16 of another aspect of the invention.

FIG. 18 is a side elevation view similar to FIG. 16 of another system 700 according to another aspect of the present invention. In the aspect of the invention shown in FIGS. 16 and 17, the liquid discharged from barometric trap assembly 630 is combined with the gas discharged from wellhead assembly 620 into a common conduit 650 and forwarded to further handling or treatment. However, in some instances, it is preferable to maintain the separation of liquids and gases when forwarding liquids and gases to handling and treatment. The aspect of the invention shown in FIG. 18 maintains this separation of fluids according to another aspect of the invention.

Many of the features of system 700 are substantially identical to the features shown in system 600 of FIGS. 16 and 17, for example, valve vault 610, manifold 640, and wellhead 631 are substantially identical in systems 600 and 700. The differences between these two systems lie in wellhead assembly 720 and barometric trap assembly 730 of FIG. 18. In this aspect of the invention, wellhead assembly 720 and barometric trap assembly 730 share a common vertical conduit 722. However, contrary to system 600 shown in FIGS. 16 and 17, wellhead assembly 720 includes a second vertical conduit 725 and barometric trap assembly 730 includes a second vertical conduit 724, distinct from conduit 725. Conduit 725 communicates with a conduit 751 which transfers a substantially gaseous flow only to further processing or treatment and conduit 724 communicates with conduit 750 which transfers substantially a liquid flow only to further processing or treatment, for example, to a liquid storage tank (not shown). Unlike trap assembly 630, conduit 724 of trap assembly 730 may be closed by cap 727, for example, an airtight enclosure.

Similar to system 600 shown in FIGS. 16 and 17, conduit 751 of system 700 is exposed to an under-pressure, for example, about 30-40 inches of water vacuum. This vacuum draws gases and liquid from the landfill laterals through valve vault 610 and manifold 640 and into conduit 722 via tee connection 726. Again, the liquid drawn into conduit 722 settles in trap 732 and the gas is drawn up through conduit 722, through wellhead 631, through valve 733, and into conduits 725 and 751. Since conduit 722 is under vacuum, liquid in conduit 722 is drawn upward in conduit 722 as indicated by the difference in liquid level 737. Thus, as before, valve 733 regulates the flow of gas through wellhead 631 and into conduit 751 and also, by regulating the vacuum present in conduit 722, regulates the flow of liquid through trap 732 and into conduit 750. However, according to this aspect of the invention, the flow of fluid into conduit 751 is substantially limited to gas alone and the flow of fluid into conduit 750 is substantially limited to liquid alone. According to this aspect of the invention, system 700 may be used when it is preferable to separate liquid and gaseous streams from landfill laterals for separate handling or treatment.

Figure 19:
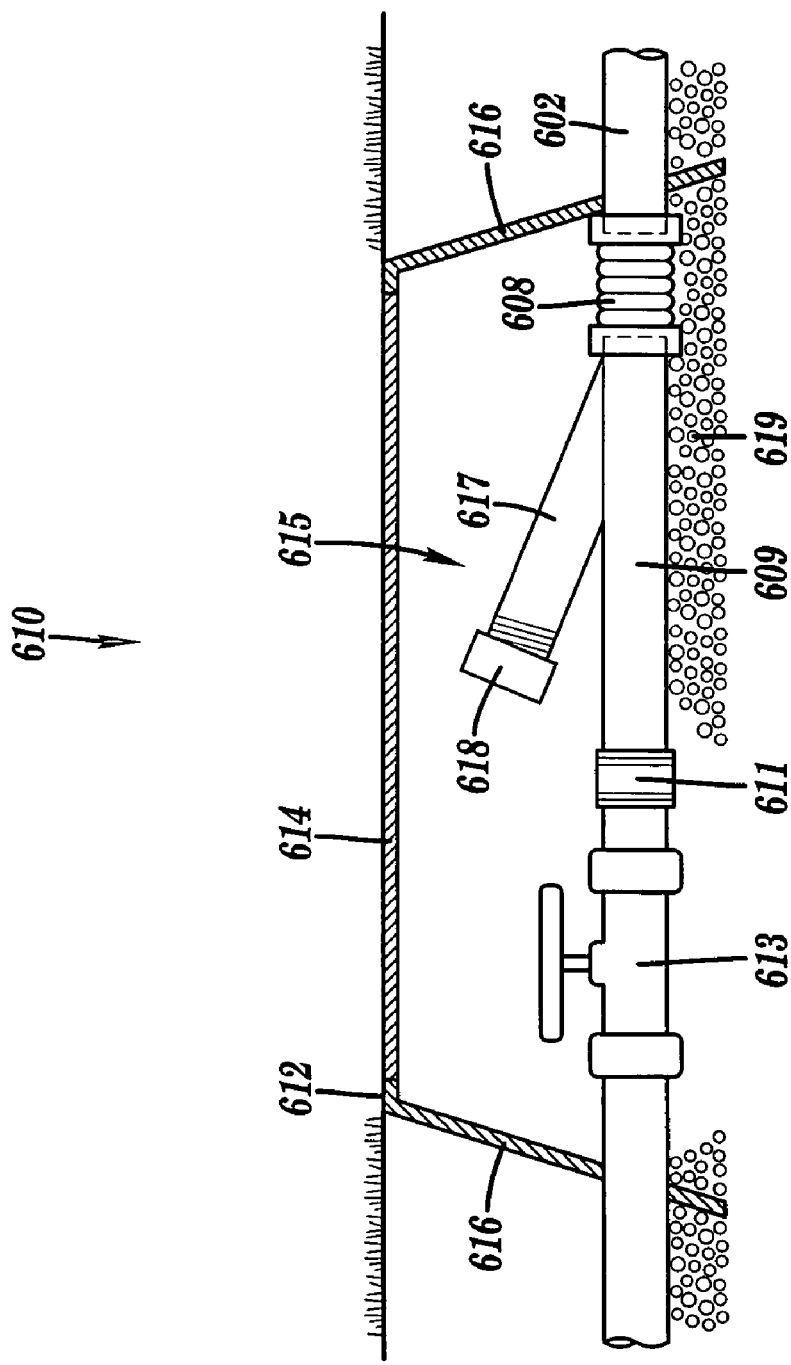
FIG. 19 is a detailed side elevation view of the valve vault shown in FIGS. 16 and 18.
Figure 20:
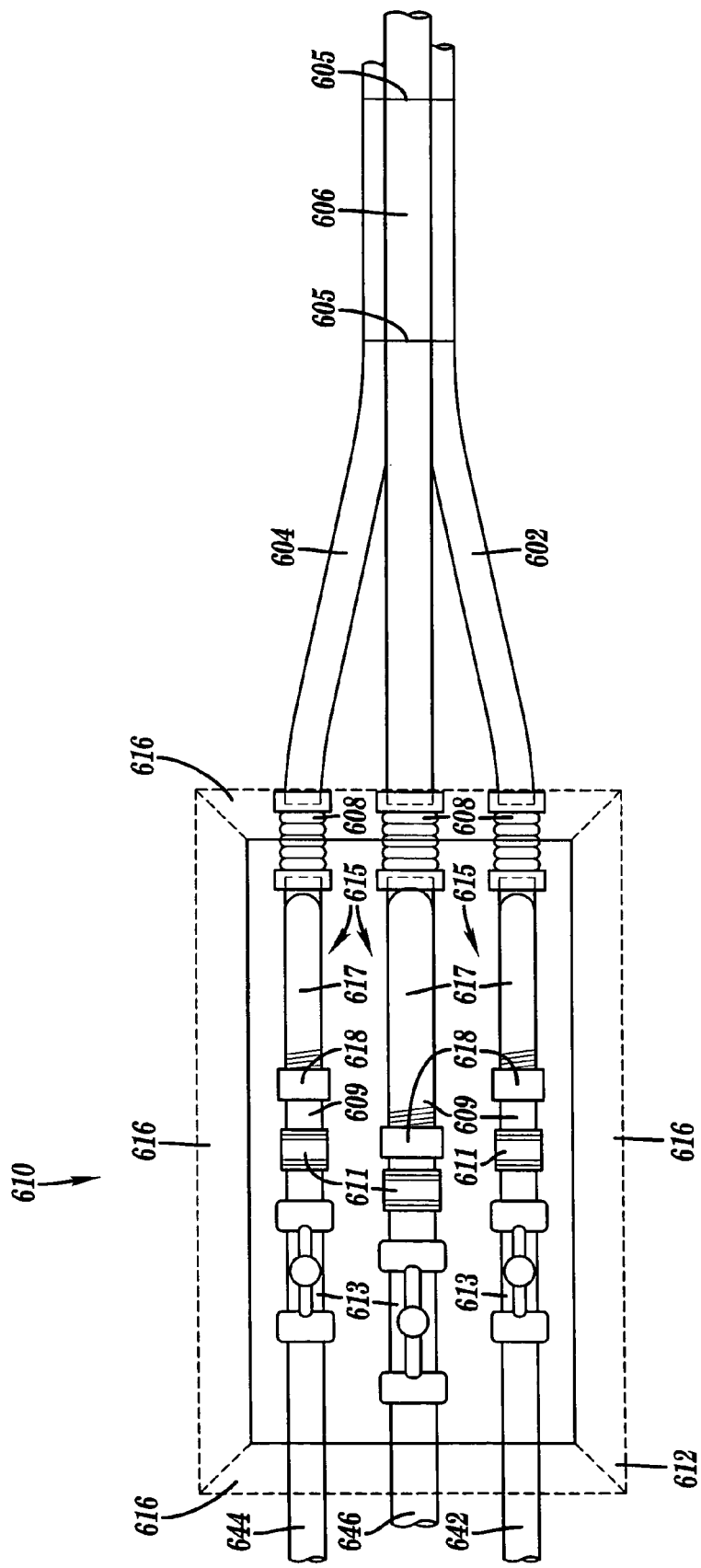
FIG. 20 is a plan view of the aspect of the invention shown in FIG. 19.

FIG. 19 is a detailed side elevation view of valve vault 610 shown in FIGS. 16 and 18. FIG. 20 is a plan view of valve vault 610 shown in FIG. 19. According to this aspect of the invention, valve vault 610 includes an enclosure 612 having a removable cover 614 and sidewalls 616. Cover 614 is not shown in FIG. 20 for clarity of illustration. Again, sidewalls 616 may be outwardly tapered, as shown, inwardly tapered, or substantially vertical. As discussed in previous aspects, enclosure 612 may include a base or floor, though as shown in FIG. 19, enclosure 612 may not include a base or floor, but may simply rest on or be imbedded in soil or stone 619. In FIGS. 19 and 20, at least one conduit 602, 604, and 606 penetrates a sidewall 616 of enclosure 612 via one or more penetrations in sidewall 616. As shown in FIG. 20, laterals 602, 604, and 606 may be bound together to facilitate handling or installation. For example, in one aspect, laterals 602, 604, and 606 may be bound together by one or more ties 605, for example, one or more nylon strap ties spaced at about 2 feet on center. Though laterals 602, 604, and 606 may be fabricated from any conventional material, in one aspect of the invention, laterals 602, 604, and 606 are made from a flexible material, for example, high-density polyethylene (HDPE) to allow for easy of manipulation and bending during installation and servicing.

After passing though sidewall 616, laterals 602, 604, and 606 are typically provided with at least one first coupling 608, for example, a flexible coupling. First coupling 608 connects laterals 602, 604, and 606, to conduits 609, second couplings 611, and valves 613. First coupling 608 may be a specially-designed flexible coupling provided by Novaflex of Toronto, Ontario, or its equivalent. Conduit 609 may be a conventional conduit, for example, any conduit connecting coupling 608 to coupling 611, but according to one aspect, conduit 609 includes at least one access port 615 for accessing the inside of conduit 609. For example, in one aspect of the invention, conduit 609 may include a tee connection or, as shown in FIG. 16, a wye connection 617, (for example, a 22 ½-degree wye connection) having a removable cap 618, for example, a threaded removable cap. Second couplings 611 may be elastomeric couplings, for example, elastomeric couplings provided by Fernco, Inc., or their equivalent. Valves 613 may be any type of valve suitable for this application. In one aspect, valves 613 may be Tru-Union ball valves, for example, EPDM ball valves, provided by Asahi America of Boston, Mass., or their equivalent. According to this aspect of the invention, valves 613 are also connected to conduits 642, 644, and 646 that communicate with pipe-connector manifold 640. According to one aspect of the invention, first couplings 608 and second couplings 611 allow maintenance personnel to more easily access and service landfill laterals 602, 604, and 606. This aspect of the invention will be discussed further below with respect to FIGS. 21 through 26.

FIGS. 21 through 26 are side elevation views, similar to FIG. 19, illustrating several modes of operation of valve vault 610 according to aspects of the invention. In these figures only representative views of conduits 602, 609, and 642 and their associated hardware are shown. It is to be understood that these views and their descriptions also apply to conduits 604, 606, 644, and 646 and their respective associated hardware.

Figure 21:
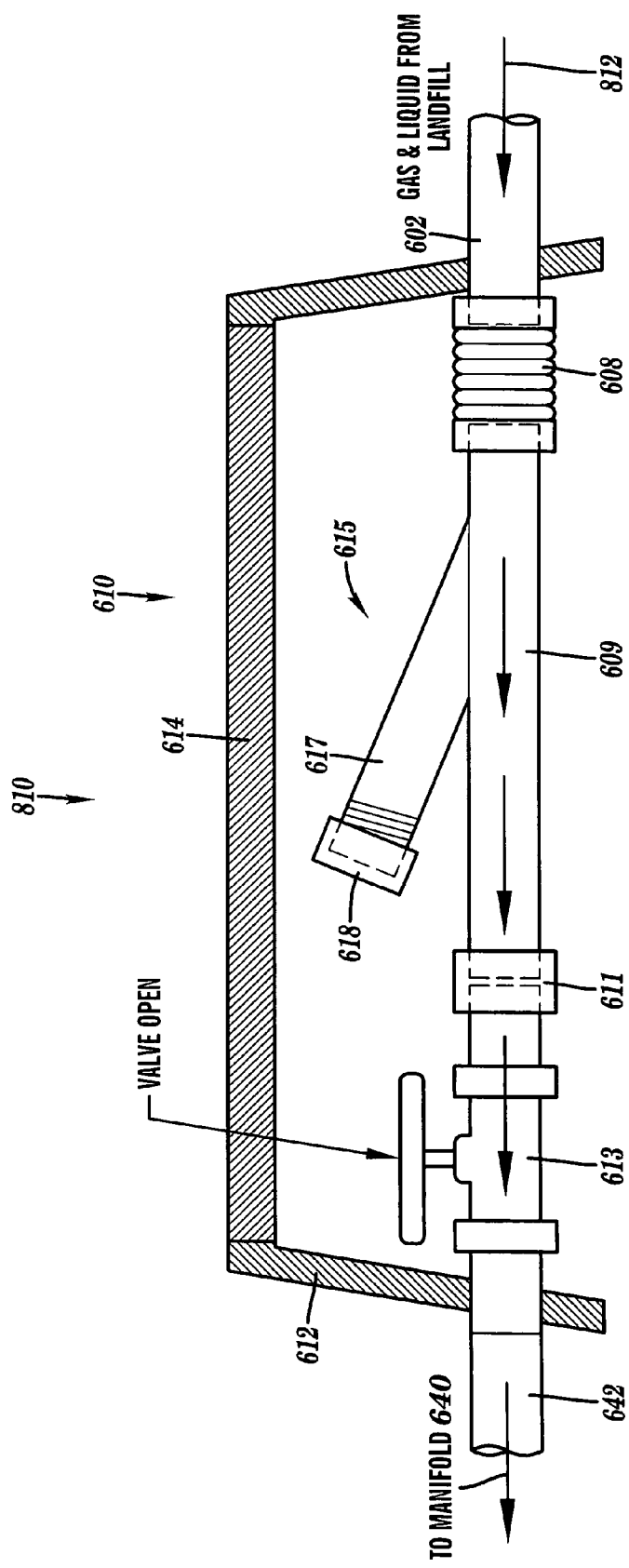
FIG. 21 through 26 are side elevation views similar to FIG. 19 illustrating several modes of operation of aspects of the invention.

FIG. 21 is a side elevation view, partially in cross-section, of a system 810 illustrating the typical normal operation of valve vault 610. Specifically, in the normal mode of operation, one or more fluids (as indicated by arrow 812) extracted from a landfill may be introduced to valve vault 610 via conduits 602, 604, and 606. In this mode, cover 614 is typically in place and valve 613 is open, wherein fluids 812 pass through coupling 608, conduit 609, coupling 611, valve 613, and conduit 642 and are passed to manifold 640. Fluids 812 pass through manifold 640 and are handled by wellhead assembly 620 (or 720) and barometric trap assembly 630 (or 730) as described above. This is the "normal" operation of valve vault 610 as fluids are extracted from a landfill.

Figure 22:
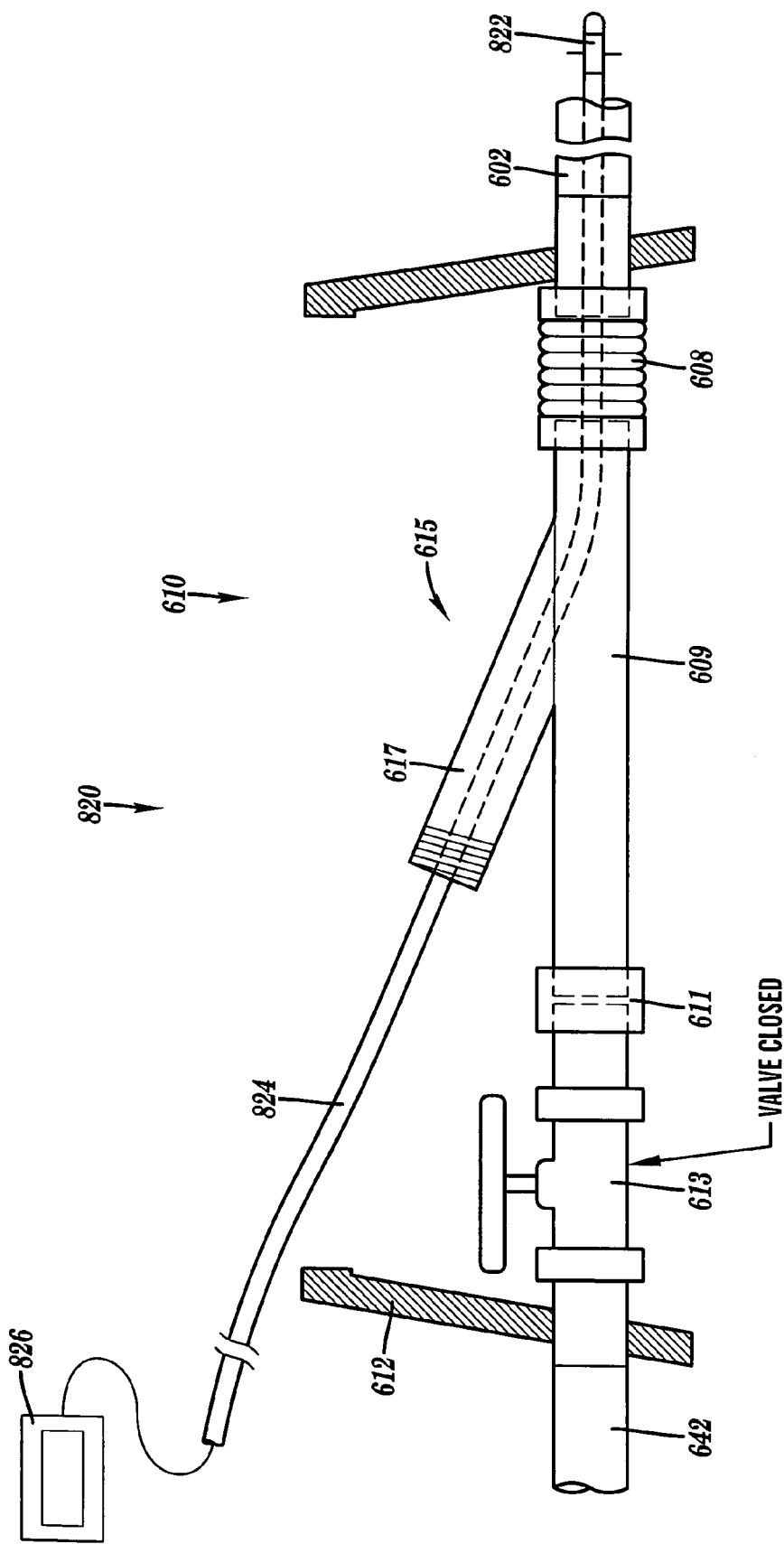

FIG. 22 is a side elevation view, partially in cross-section, of a system 820 illustrating the operation of valve vault 610 when used to inspect a landfill lateral, such as conduit 602. In this mode, valve vault cover 614 (see FIG. 21) is typically removed to provide access to the inside of valve vault 610 to maintenance personnel. Also, in this mode, valve 613 may typically be closed, essentially shutting off the flow fluid through conduits 602, 609, and 642, though some incidental fluids (liquids or gases) may still flow. In this mode, removable cap 168 (see FIG. 21) is removed from connection 615 permitting access to wye 617 and to the inside of conduits 602 and 609 and the inside of coupling 608. In one aspect, the arrangement shown in FIG. 22 provides for ease of manual or visual access to components adjacent to wye 617. Also, in one aspect of the invention, a remote sensing or inspection device 822 may now be inserted through wye 617 and into conduit 602 to inspect the inside of conduit 602 (or inspect conduits 604 or 606). In one aspect, the remote sensing device 822 may be a visual imaging or recording device, such as a closed circuit television (CCTV) camera, video camera, or like device. The inspection device 822 may include associated data transfer or control wiring or cabling 824 through which images or other data are transmitted back to a monitor or recording device 826. In one aspect of the invention, inspection device 822 may be inserted into conduit 602 by some form of pushing device, also identified as item 824, for example, a CCTV push rod. As shown in FIG. 22, aspects of the present invention facilitate remote inspection of landfill laterals and related components.

Figure 23:
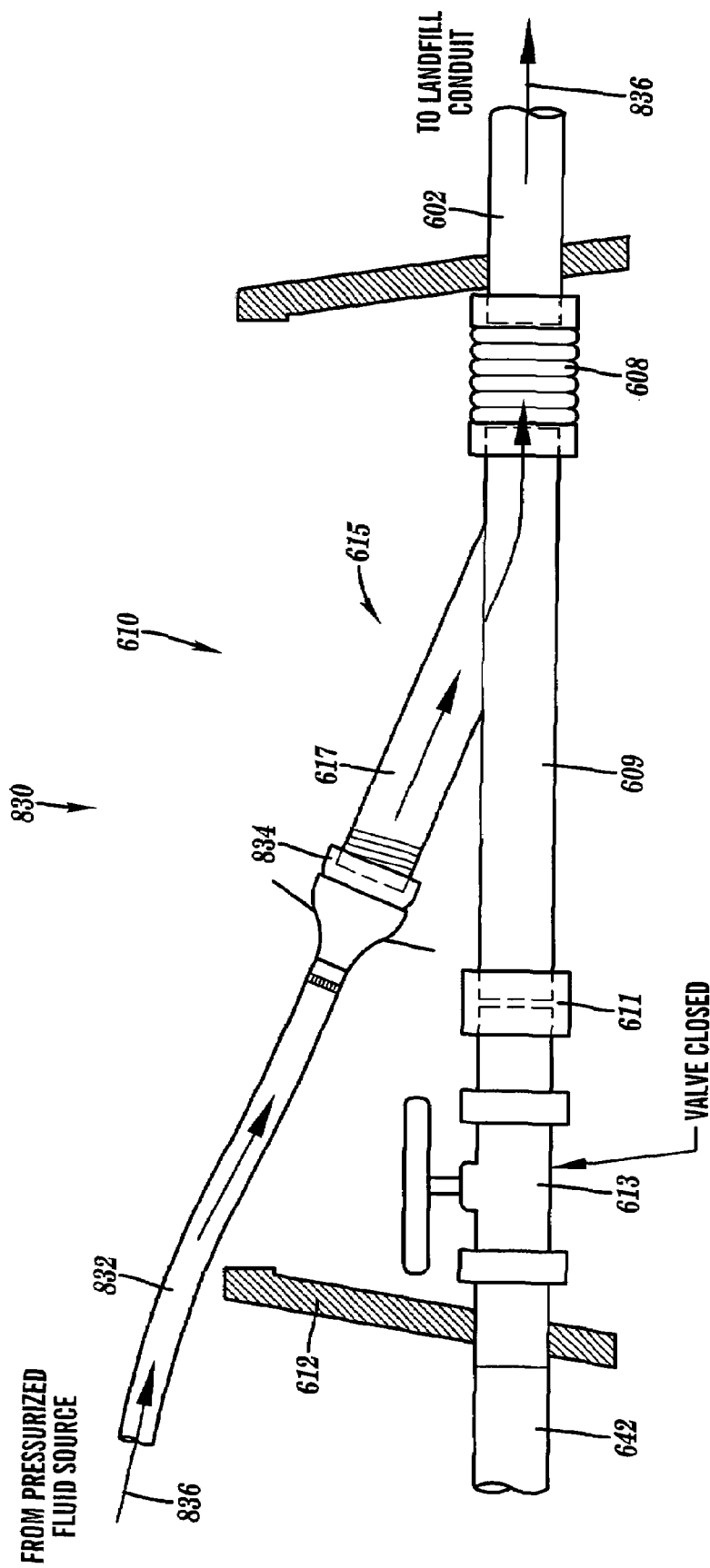

FIG. 23 is a side elevation view, partially in cross-section, of system 830 illustrating the operation of valve vault 610 when used to inject a fluid into a landfill lateral. According to this aspect of the invention, a fluid (for example, a gas or liquid) may be injected into a landfill lateral to, for example, dislodge obstructions. Again, in this mode, valve vault cover 614 (see FIG. 21) is typically removed to provide access to the inside of valve vault 610 to maintenance personnel. Also, valve 613 may typically be closed, essentially shutting off the flow fluid through conduits 602, 609, and 642, though some incidental fluids (liquids or gases) may still flow, and removable cap 168 (see FIG. 21) is removed to permit access to wye 617 and to the inside of conduits 602 and 609 and the inside of coupling 608. In this aspect of the invention, a pressurized supply of fluid may be introduced via conduit 832, for example, a flexible hose, to conduit 602 (or conduits 604 or 606) to dislodge obstructions. As shown, conduit 832 may be mounted to wye 617 by means of a threaded coupling 834, for example, a threaded quick disconnect coupling, for instance, a Cam-lok quick-disconnect coupling provided by W. S. Pratt of Rensselaer, N.Y., or its equivalent. In one aspect, wye 617 is threaded and at least the screw threads on wye 617 are metallic, for example, steel or stainless steel, whereby the metallic screw threads facilitate repeated mounting of coupling 834. In one aspect of the invention, the entire wye 617 and pipe 609 are metallic.

The pressurize fluid (indicated by arrow 836) may be provide by any fluid pressurizing device (not shown), for example, a pump or blower. In one aspect of the invention, the pressurized fluid is water at a pressure of between about 10 psig and about 500 psig, for example, between about 50 psig and about 120 psig. In another aspect of the invention, the pressurized fluid may be air at a pressure of between about 5 psig and about 500 psig, for example, between about 50 and 100 psig. As shown in FIG. 23, aspects of the present invention facilitate the mounting of pressurized hoses to a access conduit for providing a pressurized flow of fluid to a landfill conduit to, among other things, dislodge obstructions in landfill conduits.

Figure 24:
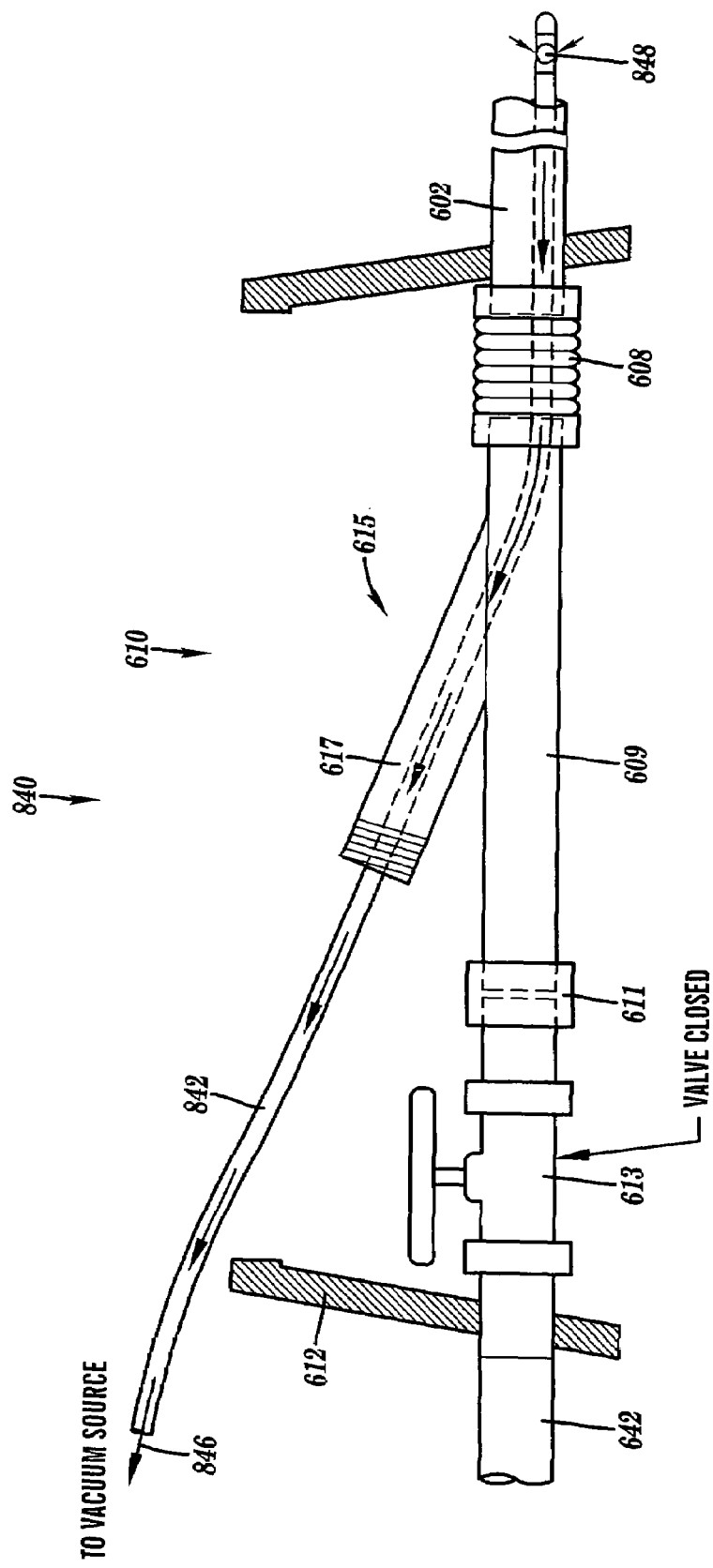

FIG. 24 is a side elevation view, partially in cross-section, of system 840 illustrating the operation of valve vault 610 when used for removing materials, for example, solids or fluids, from specific locations in landfill conduits, for example, a process referred to as "pinpoint extraction". According to this aspect of the invention, a fluid (for example, a gas or liquid) may be extracted from landfill conduit, by positioning a source of under-pressure (or vacuum) at a location within the conduit. Again, in this mode, valve vault cover 614 (see FIG. 21) is typically removed to provide access to the inside of valve vault 610 to maintenance personnel. Also, valve 613 may typically be closed, essentially shutting off the flow of fluid through conduits 602, 609, and 642, though some incidental fluids (liquids or gases) may still flow, and removable cap 168 (see FIG. 21) is removed to permit access to wye 617 and to the inside of conduits 602 and 609 and the inside of coupling 608. In this aspect of the invention, a source of vacuum may be introduced via conduit 842, for example, a flexible hose, to conduit 602 (or conduits 604 or 606) to extract (that is, withdraw) solids or fluids. As shown, conduit 842 may be inserted in wye 617 and routed as needed to a location within conduit 602. Conduit 842 may be a HDPE vacuum hose, for example, a hose having a 1-inch inside diameter. The insertion of conduit 842 into wye 617 may be sealed to minimize or prevent fluid leakage, for example, by means of a gasket, an o-ring, an elastomeric bushing, or any kind of conventional packing. In one aspect, conduit 842 may be inserted through an aperture in threaded cap 618 (see FIG. 21) and, for example, sealed by appropriate means, for instance, a gasket or an o-ring.

The source of under-pressurize (indicated by arrow 846) may be provided by any conventional device (not shown), for example, a vacuum pump, for instance, a liquid-ring vacuum pump. In one aspect of the invention, the vacuum may be provided by portable apparatus 400 shown in FIGS. 12 and 13. In one aspect of the invention, the vacuum drawn by the vacuum pump may be between about 15 inches of Hg and about 27 inches of Hg. In one aspect of the invention, conduit (or hose) 842 may be equipped with a nozzle for controlling the direction or velocity of the vacuum introduced to the landfill conduit, for example, a bullet-type vacuum nozzle provided by Landfill Service Corporation, or its equivalent. As shown in FIG. 24, aspects of the present invention facilitate the installation and use of vacuum hoses with landfill conduits to extract fluids, solids, or a combination of the two from buried landfill conduits.

Figure 25:
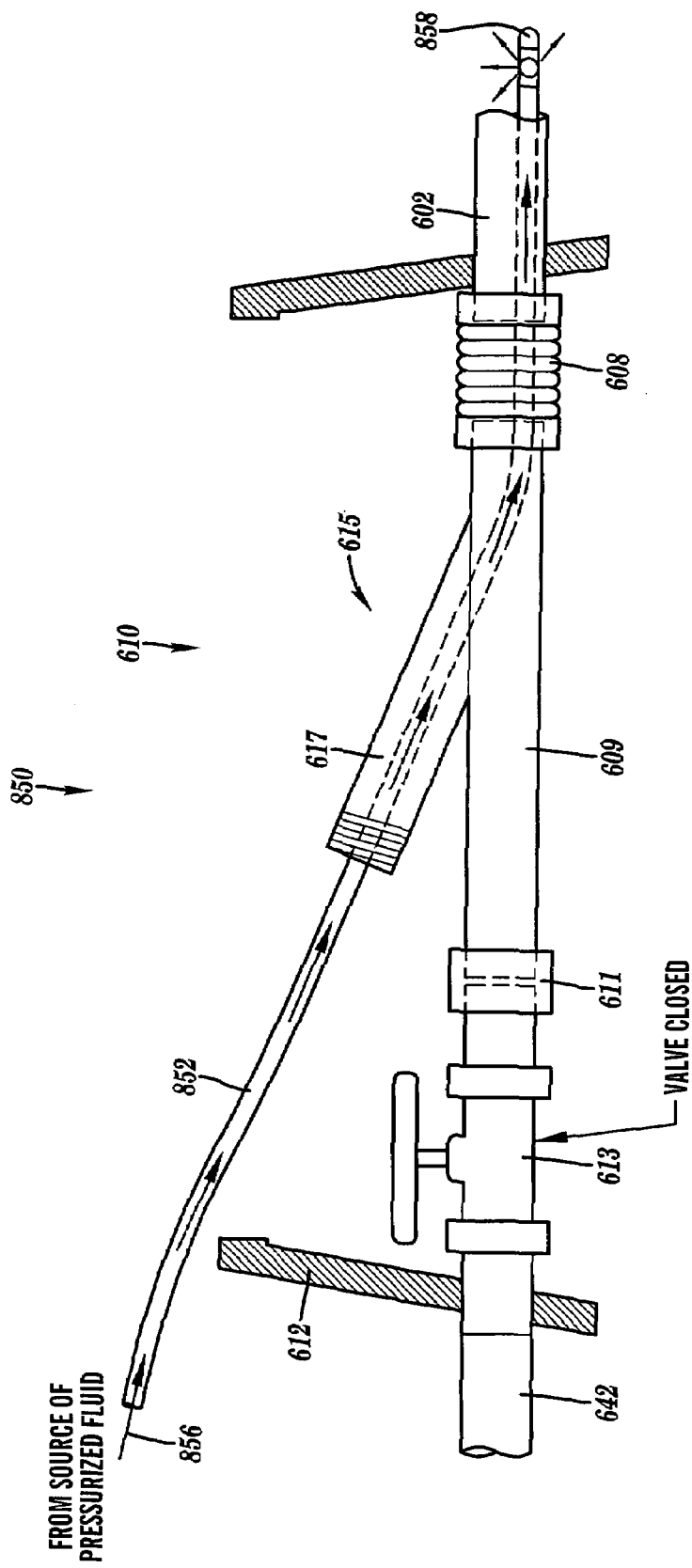

Similarly, FIG. 25 is a side elevation view, partially in cross-section, of a system 850 illustrating the operation of valve vault 610 when used for injection of fluids into specific locations in a landfill conduit, for example, a process referred to as "pinpoint injection". According to this aspect of the invention, a fluid (for example, a gas or liquid) may be injected into landfill conduit, for example, a lateral, by positioning a source of pressurized fluid at a location within the conduit. Again, in this mode, valve vault cover 614 (see FIG. 21) is typically removed to provide access to the inside of valve vault 610 to maintenance personnel. Also, valve 613 may typically be closed, essentially shutting off the flow fluid through conduits 602, 609, and 642, though some incidental fluids (liquids or gases) may still flow, and removable cap 168 (see FIG. 21) is removed to permit access to wye 617 and to the inside of conduits 602 and 609 and the inside of coupling 608. In this aspect of the invention, a source of pressurized fluid may be introduced via conduit 852, for example, a flexible hose, to conduit 602 (or conduits 604 or 606) to inject a fluid, for example, a liquid or gas into the conduit. As shown, conduit 852 may be inserted in wye 617 and routed as needed to a location within conduit 602. Conduit 852 may be a HDPE hose, for example, a hose having a 1-inch inside diameter. The insertion of conduit 852 to wye 617 may be sealed to minimize or prevent fluid leakage, for example, by means of a gasket, an o-ring, an elastomeric bushing, or any kind of conventional packing. In one aspect, conduit 852 may be inserted through an aperture in threaded cap 618 (see FIG. 21) and, for example, sealed by appropriate means, for instance, a gasket or an o-ring.

The pressurized fluid (indicated by arrow 856) may be provided by any conventional device (not shown), for example, a pump or blower. In one aspect of the invention, the pressurized fluid may be provided by portable apparatus 500 shown in FIGS. 14 and 15. In one aspect of the invention, the fluid injected into conduit 852 is water at a pressure of between about 10 psig and about 500 psig, for example, between about 50 psig and about 120 psig. In another aspect of the invention, the fluid injected into conduit 852 is air at a pressure of between about 5 psig and about 500 psig, for example, between about 50 and about 100 psig. In one aspect of the invention, conduit (or hose) 842 may be equipped with a nozzle 858 for controlling the direction or velocity of the fluid when introduced to the landfill conduit, for example, a bullet-type nozzle provided by Landfill Service Corporation, or its equivalent. As shown in FIG. 25, aspects of the present invention facilitate the installation and use of pressurized fluid hoses with landfill conduits to inject fluids into buried landfill conduits to, among other things, dislodge obstructions or add fluids to the solid waste in the landfill.

Figure 26:
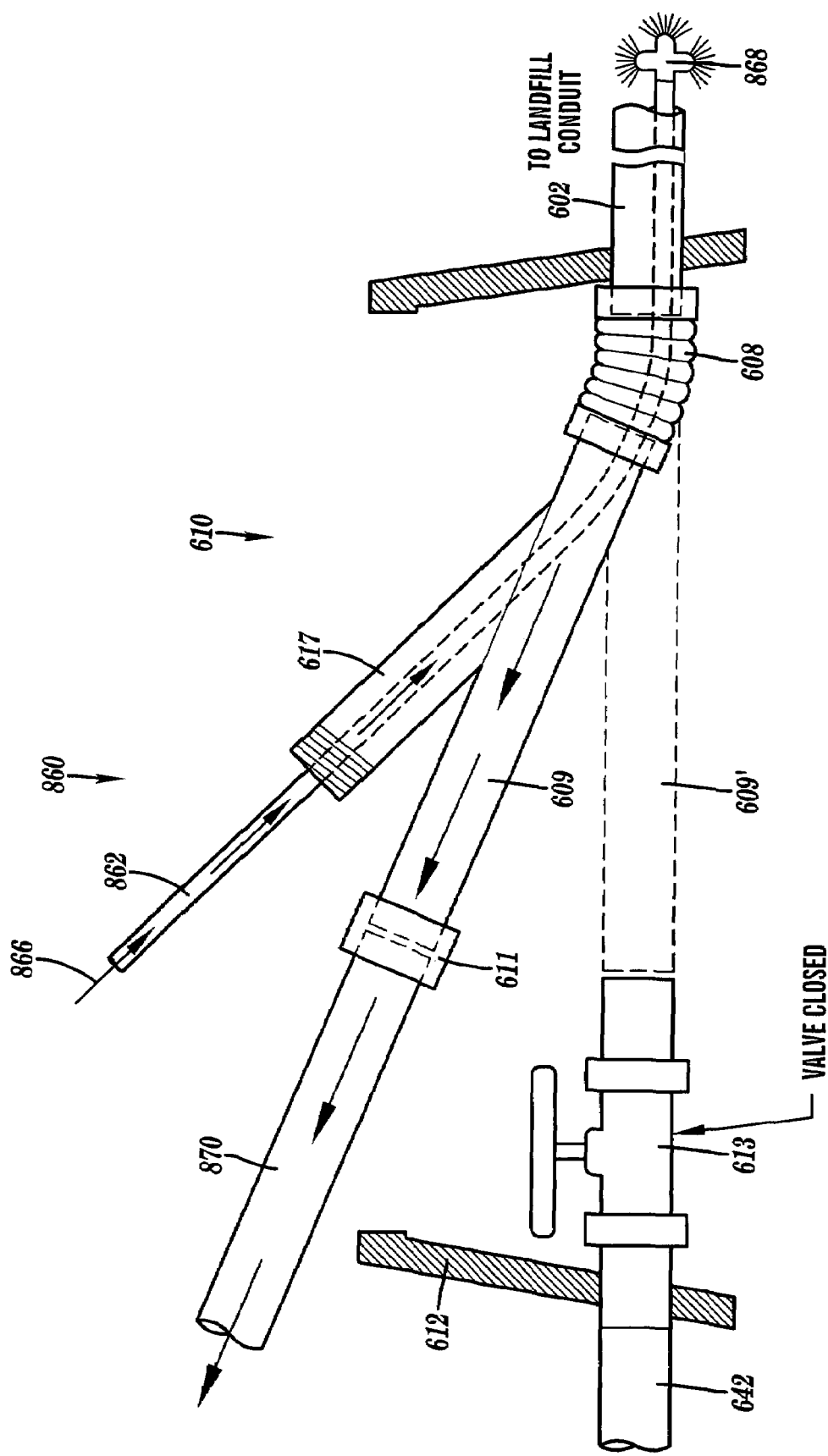

FIG. 26 is a side elevation view, partially in cross-section, of another system 860 illustrating the operation of valve vault 610 when used for injection of fluids and the removal of fluids, for example, at the same time. According to this aspect of the invention, similar to the system 850 shown in FIG. 25, a fluid (for example, a gas or liquid) may be injected into landfill conduit, for example, a lateral, by positioning a source of pressurized fluid at a location within the conduit. However, according to the aspect shown in FIG. 26, valve vault 610 may also be used to withdraw or extract fluids from a landfill conduit at, for example, the same time fluids are being introduced.

Again, in this mode, valve vault cover 614 (see FIG. 21) is typically removed to provide access to the inside of valve vault 610 to maintenance personnel. Also, valve 613 may typically be closed, essentially shutting off the flow fluid through conduits 602, 609, and 642, though some incidental fluids (liquids or gases) may still flow, and removable cap 168 (see FIG. 21) is removed to permit access to wye 617 and to the inside of conduits 602 and 609 and the inside of coupling 608. Moreover, in this aspect of the invention, coupling 611 is typically disconnected from the conduit leading to valve 613, and conduit 609 is deflected from its initial position (illustrated in phantom by conduit 609') to allow attachment of a new fluid withdrawal conduit 870 to conduit 609 via coupling 611. According to this aspect of the invention, coupling 608 is sufficiently flexible to allow the deflection of conduit 609 to the new position whereby conduit 609 can be connected to new conduit 870. According to this aspect of the invention, a source of pressurized fluid may also be introduced via conduit 862, for example, a flexible hose, to conduit 602 (or conduits 604 or 606) to inject a fluid, for example, a liquid or gas. As shown, conduit 862 may be inserted in wye 617 and routed as needed to a location within conduit 602. Conduit 862 may be a high-pressure hose, for example, a hose having a ½- to ¾-inch inside diameter. The insertion of conduit 862 to wye 617 may be sealed to minimize or prevent fluid leakage, for example, by means of a gasket, an o-ring, an elastomeric bushing, or any kind of conventional packing. In one aspect, conduit 862 may be inserted through an aperture in threaded cap 618 (see FIG. 21) and, for example, sealed by appropriate means, for instance, a gasket or an o-ring. Again, the pressurized fluid (indicated by arrow 866) may be provided by any conventional device (not shown), for example, a pump or blower or apparatus 500 shown in FIGS. 14 and 15. In one aspect of the invention, the fluid injected into conduit 862 may be water at a pressure of between about 500 psig and about 5000 psig, for example, between about 2000 psig and about 3500 psig. In another aspect of the invention, the fluid injected into conduit 862 may be air at a pressure of between about 50 psig to about 500 psig, for example, between about 100 psig and about 300 psig. In one aspect of the invention, conduit (or hose) 862 may be equipped with a nozzle 868 for controlling the direction or velocity of the fluid when introduced to the landfill conduit, for example, a water-jet cleaning tip provided by Sewer Equipment Company of America of Glenville, Ill., or its equivalent.

According to this aspect of the invention, before, after, or while pressurized fluid is being introduced via conduit 862, fluids may be withdrawn via conduits 609 and 870. This withdrawal of fluid, for example, liquid or gas, may assisted by a source of under-pressure being applied to conduit 870 (for example, a vacuum pump or apparatus 400 shown in FIGS. 12 and 13), or no under-pressure may be applied and the fluid may pass through conduit 870 under the force of gravity or the force of the fluid introduced via conduit 862. The withdrawal of one or more fluids from a landfill conduit via conduit 870 may be practiced while a pressurized fluid is introduced via conduit 862, before fluid is introduced via conduit 862, or after fluid is introduced via conduit 862. For example, in one aspect of the invention, fluid introduction via conduit 862 and withdrawal via conduit 870 may alternate as needed, for example, as needed to dislodge an undesirable obstruction. As shown in FIG. 26, aspects of the present invention facilitate the installation and use of pressurized fluid hoses with landfill conduits to inject fluids into buried landfill conduits to, among other things, dislodge obstructions, while at the same time permitting the removal of solids or fluids, for example, removal of the dislodged obstruction.

Figure 27:
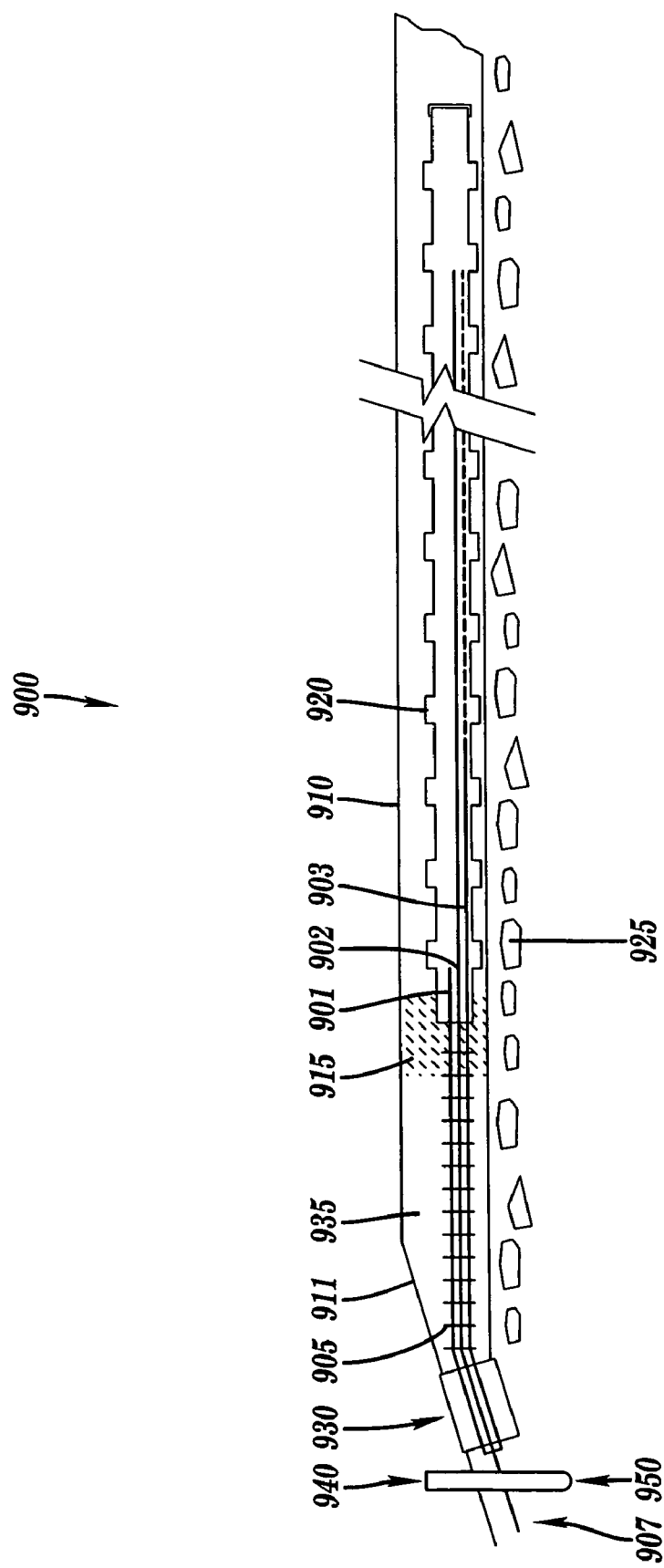
FIG. 27 is a schematic side elevation of a typical installation employing one or more aspects of the present invention.

FIG. 27 is a schematic side elevation of a typical landfill conduit installation 900 employing one or more aspects of the present invention. Landfill conduit installation 900 typically is used in a landfill 910 and includes a leachate and gas collection chamber 920, for example, a Hyex® collection chamber as described in U.S. Pat. Nos. 5,636,940 and 5,924,821, and, for example, three extraction conduits (or laterals) 901, 902, and 903. Landfill 910 may include a protective cover 911, for example, the landfill cover described in U.S. Pat. No. 5,265,979, or its equivalent. Collection chamber 920 may have a length ranging from about 300 feet to about 2000 feet. As shown in FIG. 27, conduit 901 may terminate at one end of collection chamber 920 and conduits 902 and 903 (perforated or unperforated) may extend almost the entire length of collection chamber 920. Conduits 901, 902, and 903 exit collection chamber 920 and pass underground to valve vault 930. Conduits 901, 902, and 903 may be bound with nylon straps 905, for example, bound on 2-foot centers. Valve vault 930 may be similar to valve vaults 33, 133, 233, or 610 described earlier. Valve vault 930 communicates with wellhead assembly 940 and barometric trap assembly 950, as described above. As shown, wellhead assembly 940 and barometric trap assembly 950 may be positioned on an incline, for example, on a slope of the landfill 910. Wellhead assembly 940 may be similar to wellhead assemblies 163 and 620 discussed above and barometric trap assembly 950 may be similar to barometric trap assemblies 150 and 630 discussed above. Conduits 907 may then extend from barometric trap assembly 950 to a landfill manifold collection system (not shown), as discussed above.

According to conventional practice, collection chamber 920 may be installed over a layer of porous bedding 925, for example, a waste-derived material, for instance, waste tire chips. The downstream end of collection chamber 920 may typically be embedded in clay soil 915, for example, about 10 feet of clay soil, to provide a barrier or "plug" to the flow of landfill leachate and landfill gases. Conduits 901, 902, and 903 pass through this plug 915 in passing to valve vault 930. As is also typical, conduits 901, 902, and 903 may be embedded in crushed stone 935 or other suitable porous media between collection chamber 920 and valve vault 930.

Aspects of the present invention, for example, those illustrated and described with respect to FIGS. 2 through 26 may be used to access, service, or otherwise maintain landfill conduit installation 900. For example, the aspects of the present invention illustrated and described with respect to FIGS. 16 through 20 may be used to operate landfill conduit installation 900. Also, the aspects of the present invention illustrated and described with respect to FIGS. 21 through 26 may be used to service conduits 901, 902, and 903.

Unless otherwise noted, the housings, conduits, pipes, and related conduit and pipe connectors shown in FIGS. 16-27 may be made from any conventional material of construction; for example, they may be made from metallic or non-metallic materials. For example, in one aspect, these components may made from plastic, for example, PVC plastic, polyethylene (PE) plastic, high-density polyethylene (HDPE) plastic, polypropylene (PP), polyester, or their equivalents. In one aspect, these components may be made from iron, steel, aluminum, or any similar structural metals. Also, the size of the housings, conduits, pipes, and related conduit and pipe connectors shown in FIGS. 16-27 may also vary depending upon the volume of fluids being handled or the number of conduits used. In one aspect of the invention, the conduits in FIGS. 16-27 may vary from about 1 inch in nominal diameter to about 5 feet in nominal diameter. However, the conduits shown in these FIG. 16-27 typically have nominal diameters between about 2 inches and about 6 inches, for example, in one aspect, conduits 602 and 604 are about 3 inches in nominal diameter and conduit 606 is about 4 inches in nominal diameter.

Aspects of the present invention provide improved systems, methods, and apparatus for operating and servicing landfills and landfill conduits. The systems, methods, and apparatus may be used to introduce fluids to or remove fluids from landfill conduits that, according to the prior art, were deemed unserviceable or unusable and placed back in operation. Aspects of the present invention, may be incorporated into new landfill conduit systems or retrofit into existing landfill conduit systems.

As will be appreciated by those skilled in the art, features, characteristics, and/or advantages of the systems, methods, and apparatuses described herein, may be applied and/or extended to any embodiment (for example, applied and/or extended to any portion thereof).

Although several aspects of the present invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A system for servicing at least one landfill conduit, the system comprising:
   an enclosure having a first end wall and a second end wall opposite the first end wall, the first and second end walls having at least one aperture;
   at least one inlet conduit passing through the at least one aperture in the first end wall, the at least one inlet conduit in fluid communication with at least one landfill conduit;
   at least one outlet conduit passing through the at least one aperture in the second end wall, the at least one outlet conduit in fluid communication with a landfill fluid handling system;
   at least one service conduit providing fluid communication between the at least one inlet conduit and the at least one outlet conduit; and
   at least one access port positioned in the at least one service conduit.

2. The system recited in claim 1, wherein the at least one inlet conduit comprises a plurality of inlet conduits.

3. The system recited in claim 2, wherein the plurality of inlet conduits comprise at least one larger conduit having a first diameter and at least one smaller conduit having a second diameter smaller than the first diameter, the at least one smaller conduit positioned within the larger conduit.

4. The system recited in claim 3, wherein the at least one larger conduit comprises a flared expansion.

5. The system recited in claim 4, further comprising fluid sealing means between at least one of: the at least one smaller conduit and the flared expansion, and the larger conduit and the at least one aperture in the first end wall.

6. The system recited in claim 1, further comprising at least one valve positioned in the at least one service conduit for regulating fluid flow through the service conduit.

7. The system recited in claim 1, further comprising fluid sealing means between at least one of: the at least one inlet conduit and the at least one aperture in the first end wall and the at least one outlet conduit and the at least one aperture in the second end wall.

8. The system recited in claim 1, wherein the access port in the at least one service conduit comprises a wye pipefitting.

9. The system recited in claim 1, wherein the enclosure comprises a frusto-conical enclosure having downwardly expanding sidewalls.

10. The system recited in claim 1, wherein the enclosure further comprises at least one access cover.

11. The system recited in claim 1, wherein the landfill fluid handling system comprises at least one of a gas-flow-control well head, a barometric trap, and a landfill manifold system.

12. The system as recited in claim 1, further comprising a coupling positioned between the at least one inlet conduit and the at least one service conduit.

13. The system as recited in claim 12, wherein the coupling comprises a flexible coupling.

14. The system as recited in claim 13, wherein the flexible coupling comprises a flexible coupling that is adapted to be permit deflection of the service conduit from a first position, substantially parallel with the at least one inlet conduit, to a second position, substantially non-parallel with the at least one inlet conduit, while maintaining fluid communication with the at least one landfill conduit.

15. A method for servicing at least one landfill conduit using a servicing system, the servicing system comprising:
- an enclosure having a first end wall and a second end wall opposite the first end wall, the first and second end walls having at least one aperture;
- at least one inlet conduit passing through the at least one aperture in the first end wall, the at least one inlet conduit in fluid communication with the at least one landfill conduit;
- at least one outlet conduit passing through the at least one aperture in the second end wall, the at least one outlet conduit in fluid communication with a landfill fluid handling system;
- at least one service conduit for providing fluid communication between the at least one inlet conduit and the at least one outlet conduit;
- a valve positioned between the at least one inlet conduit and the at least one outlet conduit for regulating fluid flow through the at least one service conduit; and
- at least one closable access port positioned in the at least one service conduit; the method comprising:

isolating a first landfill conduit from the landfill handling system by closing the valve in a first service conduit; and opening the closable access port in the first service conduit; and servicing the at least one landfill conduit via the opened access port.

16. The method as recited in claim 15, wherein servicing the at least one landfill conduit comprises one of: visual inspection, fluid jet cleaning, vacuum cleaning, and remote video inspection.

17. The method as recited in claim 15, wherein the at least one landfill conduit further comprises a second landfill conduit and wherein the servicing system further comprises a second service conduit having a valve and an access port, and wherein the method further comprises:
- after servicing the at least one landfill conduit, closing the closable access port in the first service conduit;
- isolating the second landfill conduit from the landfill handling system by closing the valve in the second service conduit;
- opening the access port in the second service conduit; and servicing the second landfill conduit via the access port in the second service conduit.

18. The method as recited in claim 17, wherein servicing a second landfill conduit comprises one of: visual inspection, fluid jet cleaning, vacuum cleaning, and remote video inspection.

* * * * *